(12) United States Patent
Campbell et al.

(10) Patent No.: US 11,407,663 B2
(45) Date of Patent: Aug. 9, 2022

(54) FLOW-THROUGH ELECTRODE CAPACITIVE DEIONIZATION CELL

(71) Applicant: Lawrence Livermore National Security, LLC, Livermore, CA (US)

(72) Inventors: Patrick G. Campbell, Oakland, CA (US); Jennifer M. Knipe, Oakland, CA (US); Michael Stadermann, Pleasanton, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 173 days.

(21) Appl. No.: 15/809,864

(22) Filed: Nov. 10, 2017

(65) Prior Publication Data
US 2019/0144310 A1 May 16, 2019

(51) Int. Cl.
C02F 1/469 (2006.01)
C02F 1/461 (2006.01)
H01G 9/10 (2006.01)
H01G 9/048 (2006.01)
H01G 9/02 (2006.01)
H01G 9/12 (2006.01)
H01G 9/00 (2006.01)
C02F 103/08 (2006.01)

(52) U.S. Cl.
CPC ........ *C02F 1/4691* (2013.01); *C02F 1/46109* (2013.01); *H01G 9/0029* (2013.01); *H01G 9/02* (2013.01); *H01G 9/048* (2013.01); *H01G 9/10* (2013.01); *H01G 9/12* (2013.01); *C02F 2001/46161* (2013.01); *C02F 2103/08* (2013.01); *C02F 2201/46115* (2013.01)

(58) Field of Classification Search
CPC .................................................... C02F 1/4691
See application file for complete search history.

(56) References Cited

U.S. PATENT DOCUMENTS

| | | | |
|---|---|---|---|
| 5,415,768 A * | 5/1995 | Andelman | B01D 15/36 204/600 |
| 5,538,611 A * | 7/1996 | Otowa | B01J 19/087 204/518 |
| 9,758,392 B2 | 9/2017 | Stadermann et al. | |

(Continued)

OTHER PUBLICATIONS

Suss, M.E. et al. (2012) "Capacitive desalination with flow-through electrodes," Energy Environ. Sci. 5:9511-9519.

*Primary Examiner* — Salil Jain
(74) *Attorney, Agent, or Firm* — Foley & Lardner LLP

(57) ABSTRACT

Disclosed here is a capacitive deionization device for removing ions from a target solution. The capacitive deionization device includes a first porous electrode, a second porous electrode, a first header plate, a second header plate, and a sealant. The second porous electrode is disposed below and spaced from the first porous electrode. The first header plate is disposed on the first porous electrode. The first header plate defines an input flow channel that is in fluidic communication with the first porous electrode. The second header plate is disposed below the second porous electrode. The second header plate defines an output flow channel that is in fluidic communication with the second porous electrode. The sealant is disposed between the first header plate and the second header plate and surrounds the first porous electrode and the second porous electrode.

7 Claims, 26 Drawing Sheets

(56) References Cited

U.S. PATENT DOCUMENTS

| | | | |
|---|---|---|---|
| 2008/0073288 A1* | 3/2008 | Fan | C02F 1/4691 |
| | | | 204/554 |
| 2012/0273359 A1* | 11/2012 | Suss | B03C 9/00 |
| | | | 204/554 |
| 2012/0295199 A1* | 11/2012 | Takeyama | C08L 63/00 |
| | | | 430/280.1 |
| 2014/0202880 A1 | 7/2014 | Suss et al. | |
| 2017/0200566 A1 | 7/2017 | Stadermann et al. | |

* cited by examiner

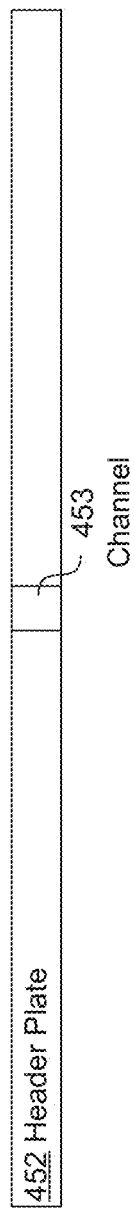

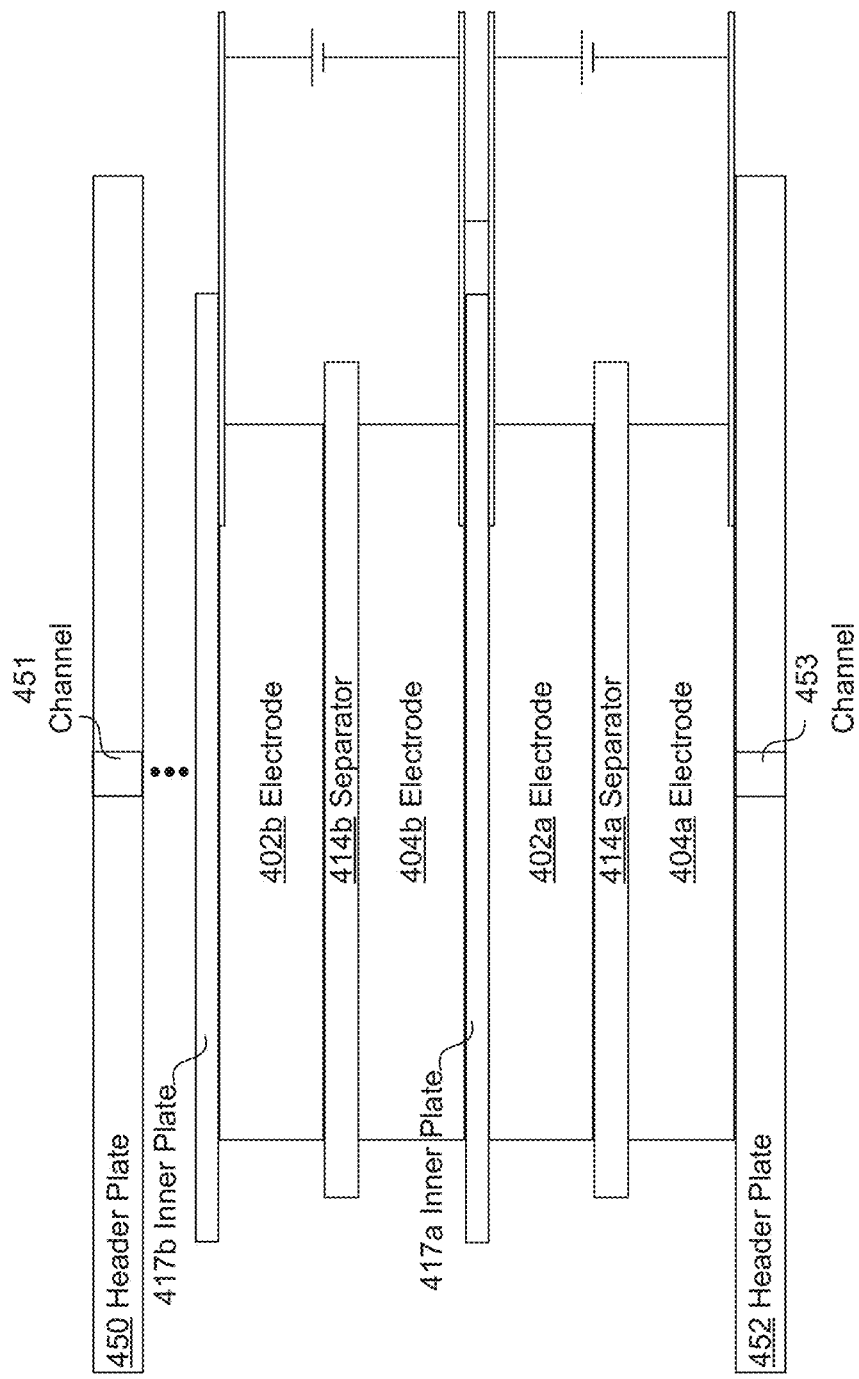

- Ag wire treated with bleach (30 min)
- Ag/AgCl wire between two coffee filters, sandwiched between two HCAM electrodes

FLOW-THROUGH ELECTRODE CAPACITIVE DEIONIZATION CELL

FEDERAL FUNDING STATEMENT

The United States Government has rights in the invention pursuant to Contract No. DE-AC52-07NA27344 between the U.S. Department of Energy and Lawrence Livermore National Security, LLC, for the operation of Lawrence Livermore National Laboratory.

BACKGROUND

Desalination is a process that removes dissolved minerals and/or salts from saline water (e.g., seawater), brackish water, or treated wastewater to produce fresh water. Currently, membrane-based processes, such as reverse osmosis (RO), are used for water desalination. Reverse osmosis uses a semipermeable membrane to remove ions (e.g., salt) from the water. A pressure is applied to the feed side to push the water to overcome osmotic pressure and pass through the membrane. Ions do not pass through the membrane and therefore are removed from the water. Generally energy use in reverse osmosis scales with the amount of water produced. However, the energy efficiency of reverse osmosis can be low.

SUMMARY

One aspect of some embodiments of the present disclosure relates to a capacitive deionization device for removing ions from a target solution. The capacitive deionization device includes a first porous electrode, a second porous electrode, a first header plate, a second header plate, and a sealant. The sealant may be, e.g., a photo-curable sealant or a thermal-curable sealant, such as silicone, epoxy, acrylic, room-temperature-vulcanizing silicone, etc. The second porous electrode is disposed below and spaced from the first porous electrode. The first header plate is disposed on the first porous electrode. The first header plate defines an input flow channel that is in fluidic communication with the first porous electrode. The second header plate is disposed below the second porous electrode. The second header plate defines an output flow channel that is in fluidic communication with the second porous electrode. The epoxy sealant is disposed between the first header plate and the second header plate and surrounds the first porous electrode and the second porous electrode.

Another aspect of some embodiments of the present disclosure relates to a capacitive deionization cell for removing ions from a target solution. The capacitive deionization cell includes a first porous electrode, a second porous electrode, a first header plate, and a second header plate. The second porous electrode is disposed below and spaced from the first porous electrode. The first header plate is disposed on the first porous electrode. The first header plate has a first surface facing the first porous electrode and a second surface opposite to the first surface. The first header plate defines a plurality of micro-channels distributed on the first surface adjacent to the first porous electrode. The micro-channels are in fluidic communication with the first porous electrode. The second header plate is disposed below the second porous electrode. The second header plate has a first surface facing the second porous electrode and a second surface opposite to the first surface. The second header plate defines a plurality of micro-channels distributed on the first surface adjacent to the second porous electrode. The micro-channels are in fluidic communication with the second porous electrode.

A further aspect of some embodiments of the present disclosure relates to a method for fabricating a capacitive deionization cell for removing ions from a target solution. The method includes: placing a first electrode stack on a bottom header plate, the first electrode stack including a first porous electrode, a second porous electrode and a separator disposed between the first porous electrode and the second porous electrode; placing a top header plate on the first electrode stack; applying a mechanical pressure between the top header plate and the bottom header plate; and disposing a UV-curable epoxy sealant between the first header plate and the second header plate and surrounding the first electrode stack.

These and other features, together with the organization and manner of operation thereof, will become apparent from the following detailed description when taken in conjunction with the accompanying drawings.

BRIEF DESCRIPTION OF THE DRAWINGS

FIG. 5A illustrates one or more stages of a method of fabricating an FTE-CDI cell.

FIG. 5H illustrates one or more stages of a method of fabricating an FTE-CDI cell.

DETAILED DESCRIPTION

Reference will now be made in detail to some specific embodiments of the invention contemplated by the inventors for carrying out the invention. Certain examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Capacitive Deionization (CDI)

Capacitive Deionization (CDI) can be used as a deionization process that consumes less energy than membrane-based processes (e.g., reverse osmosis). The CDI process applies a voltage across a pair of electrodes and flows a target water between the electrodes. The electrodes (e.g., activated carbon) have high surface areas. Due to the electrical field between the electrodes, the ions in the water move towards the electrodes, where positive ions and negative ions respectively move in opposite directions. During a charging stage, the electrodes electrostatically adsorb the ions on the high surface areas in a reversible manner. As a result, the water flowing out of the electrodes are de-ionized (e.g., desalinated). During a discharging stage, the electrodes are either short-circuited or applied an electrical field with a reverse polarity. Thus, the ions adsorbed during the previous charging stage are flushed into waste water that flows between the electrodes. In a typical CDI process, the water flow direction is perpendicular to a direction of the applied electrical field, and the discharging stage is also called axial flow discharge (AFD).

Figure 1:
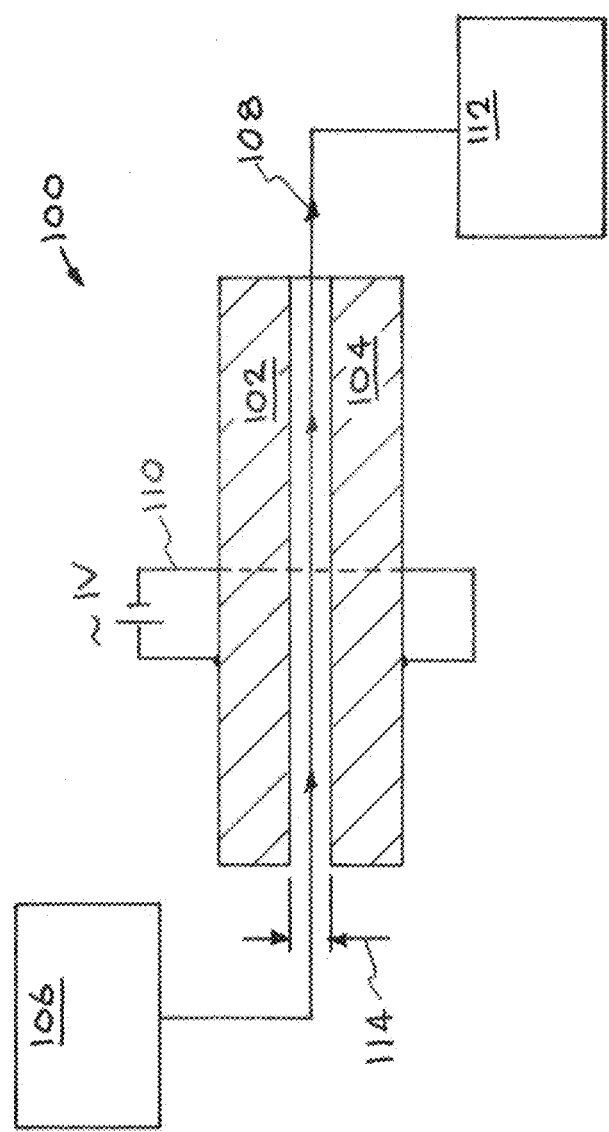
FIG. 1 illustrates a capacitive deionization (CDI) system.

FIG. 1 illustrates a capacitive deionization (CDI) system 100. The CDI system includes a pair of electrodes 102 and 104. Feed water 106 flows between the electrodes 102 and 104 in a direction 108 as illustrated in FIG. 1. The CDI system 100 further includes an electric circuit 110 that energizes the electrodes 102 and 104 and produces an electrical field across the electrodes 102 and 104. The feed water 106 enters the gap 114 between the electrodes 102 and 104 and flows in the direction 108 perpendicular to the electrical field.

During a charging stage, the electrical field acts on the feed water 106 and moves ions in the feed water 106 to adsorb on surfaces of the electrodes 102 and 104. Due to the electrical field between the electrodes 102 and 104, ions in the feed water 106 are attracted to respective electrodes. Negative ions are attracted towards the positively charged electrode, and positive ions are attracted towards the negatively charged electrode. The ions are attracted to the electrodes 102 and 106 and adsorb to the surfaces of the electrodes 102 and 106. With ions removed, de-ionized water 112 is produced. The CDI system may include a water-permeable separator disposed in the gap 114 between the electrodes 102 and 104 to prevent electrical short-circuits between the electrodes 102 and 104.

At certain point, the electrodes 102 and 104 may become saturated with ions removed from the feed water 106. During a discharge stage, the ions that previously adsorbed to the electrodes 102 and 104 may be flushed into a waste water, which then contains a much higher concentration of ions.

Although the CDI process may provide nearly an order of magnitude improvement in power consumption over the membrane-based processes, the CDI process still has a relative low water recovery ratio. The water recovery ratio is defined as the amount of desalinated water produced to the total amount of input water (feed water). Further, the deionization in the CDI process is driven by the ion diffusion from the water stream to the electrode surfaces. The ion diffusion speed is a limiting factor of the deionization process.

Flow-Through Electrode Capacitive Deionization (FTE-CDI)

Figure 2A:
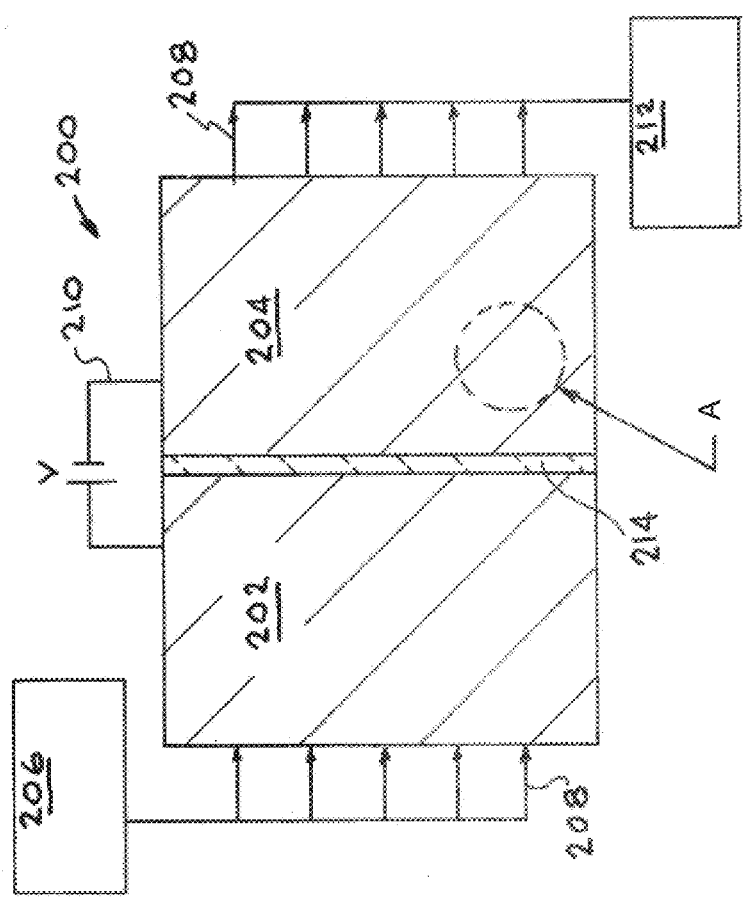
FIG. 2A illustrates a flow-through electrode capacitive deionization (FTE-CDI) system.

FIG. 2A illustrates a flow-through electrode capacitive deionization (FTE-CDI) system 200. The FTE-CDI system 200 includes a pair of electrodes 202 and 204. An electric circuit 210 energizes the electrodes 202 and 204 and produces an electrical field between the electrodes 202 and 204. The electrodes 202 and 204 are arranged such that a flow of the feed water 206 flows through the electrodes 202 and 204 and in a direction 208 parallel to an electric field applied across the electrodes 202 and 204. A water-permeable separator made of an insulative material (e.g., dielectric material) may be disposed between the electrodes 202 and 204 to prevent electrical short-circuits between the electrodes 202 and 204. The thickness of the separator may be, e.g., less than 20% of an overall thickness of each of the electrodes 202 and 204.

Figure 2B:
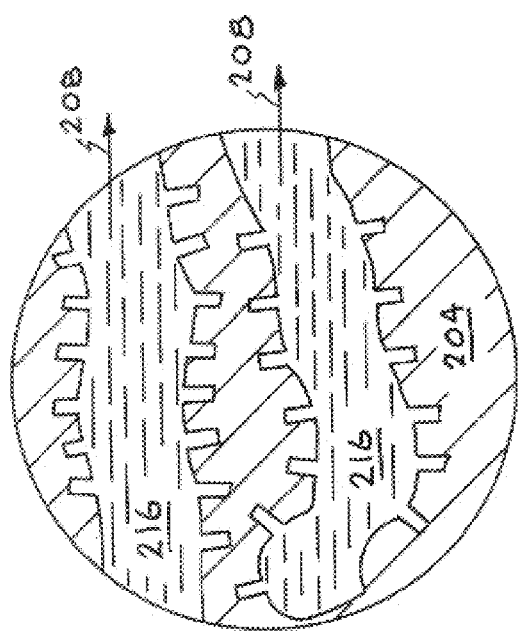
FIG. 2B illustrates a close-up view of an area A in FIG. 2A.

FIG. 2B illustrates a close-up view of a portion of the electrode 204 or 206 denoted as an area A in FIG. 2A. The electrodes 202 and 204 include pores 216 through which the feed water 206 flows. The pores 216 have high surface areas for adsorption of ions from the feed water 206. The water flow direction 208 is parallel to the direction of the applied electrical field created by the electric circuit 201. Thus, the feed water 206 flows through the porous electrodes 202 and 204 (e.g., carbon aerogel materials). Each of the electrodes 202 and 204 includes a network of small-scale (e.g., micro-sale or nano-scale) pores 216 that allow for efficient fluidic transport. The pores 216 further provide a high surface area for ion adsorption and for electrical capacitance.

By tuning the water flow through pore diameter, the system 200 may operate at a pressure several orders of magnitude below the pressure of a reverse osmosis system and has a relatively low energy consumption (and lower capital costs since all the materials, pipes, and fittings in the entire plant does not need to be built to withstand high pressure). Furthermore, by flowing the water through the porous electrodes, deionization speed of the FTE-CDI system can be an order of magnitude faster than deionization speed of the CDI system. Unlike in the CDI system where most of the ions are adsorbed at electrode surfaces that are closer to the water flow, all electrode surfaces in the FTE-CDI system are available for adsorption for the flow-through arrangement.

Figure 3A:
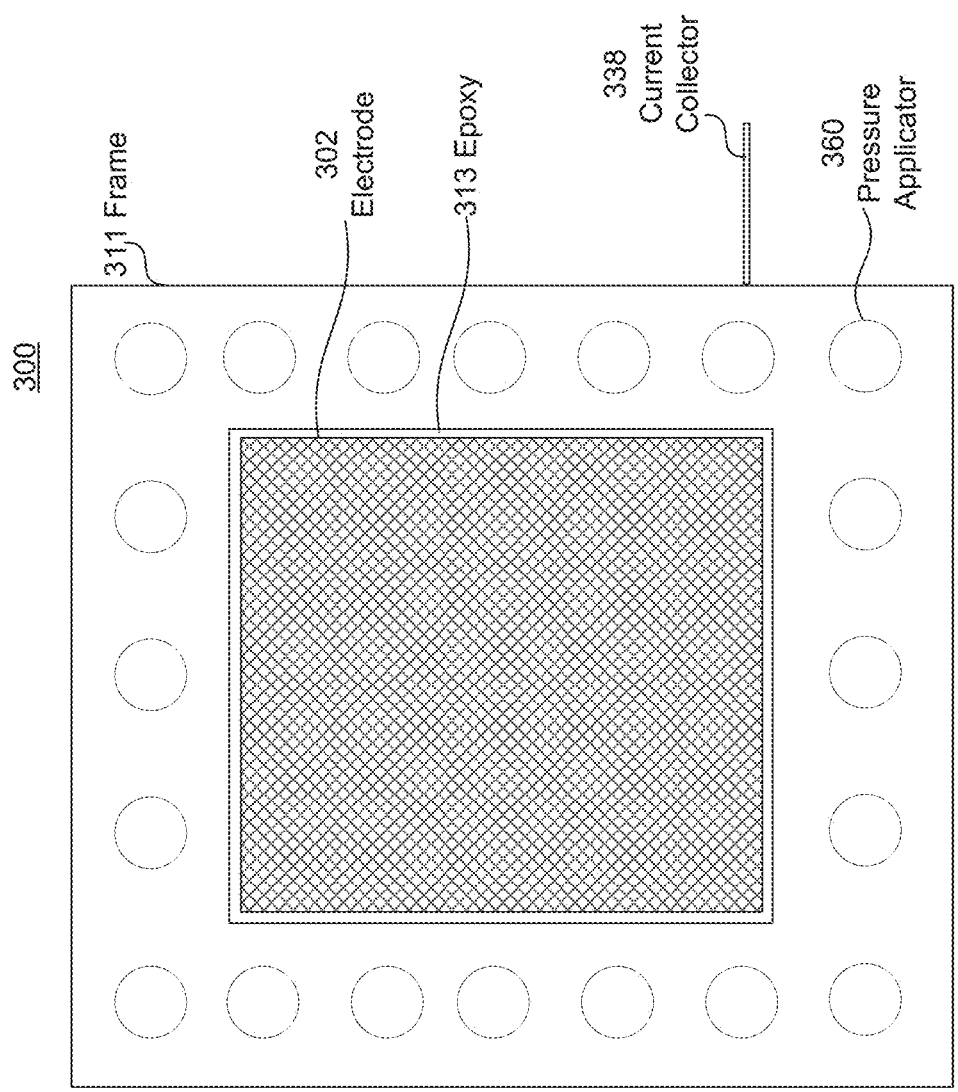
FIG. 3A illustrates a top view of an FTE-CDI cell.
Figure 3B:
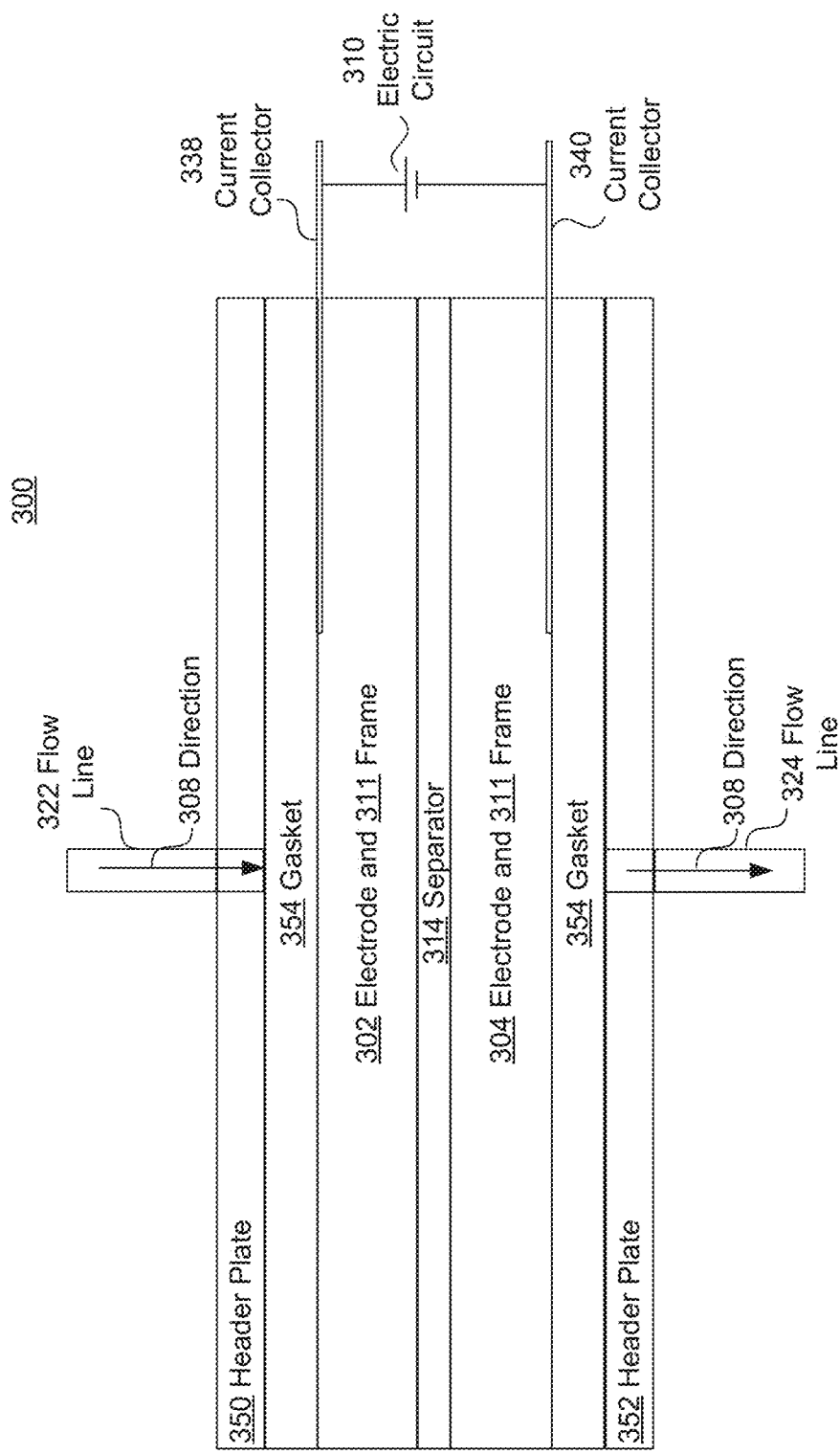
FIG. 3B illustrates a cross-sectional view of an FTE-CDI cell

The FTE-CDI system may be assembled as a cell device. FIG. 3A illustrates a top view of a flow-through electrode capacitive deionization (FTE-CDI) cell 300. FIG. 3B illustrates a cross-sectional view of an FTE-CDI cell 300. The FTE-CDI cell 300 includes flow lines 322 and 324 that provide water flow into and/or out of the cell 400. In some embodiments, a cell may include an input flow line and an output flow line. In some alternative embodiments, a cell may include multiple input flow lines and/or multiple output flow lines. In some embodiments, at least one side of the cell may include one or more off-centered flow lines to facilitate removing air bubbles during initial wetting of the cell. The FTE-CDI cell 300 includes electrodes 302 and 304, a separator 314, current collectors (e.g., current collector 338 shown in FIG. 3A), and head plates 350 and 352 that are arranged as layers stacked together as illustrated in FIG. 3B. In some embodiments, as shown in FIG. 3A, the cell 300 may include one or more frames 311. Each electrode (e.g., electrode 302) is attached to a frame 311 using, e.g., glue or epoxy. In other words, Frame 311 encloses electrode 302 as shown in FIG. 3A. The epoxy 313 seals the area between the frame 311 and the electrode (e.g., electrode 302) so that water can only flow through the electrode 302. The frames 311 and the electrodes are stacked with the gasket 354 in between. Header plates can be attached on top and at the bottom of the frames 311. The cell 300 may further include one or more pressure applicators 360 to apply mechanical pressure to the header plates 350 and 352 and/or frames 311 such that the header plates 350 and 352 and/or frames 311 hold components of the cell 300 together. The pressure applicators 360 may include, e.g., screws, bolts, clips, clamps, etc. However, it is difficult to properly dispose epoxy to seal between the electrode and the frame. If there are leaks that need to be fixed, the fixing process involves drying the electrode, applying glue, curing overnight, then testing again, often to find additional leaks that require the same steps over and over. In addition, the electrodes are susceptible to breaking due to the cycles of wetting, drying, gluing, and curing.

As shown in FIG. 3B, the inflow water 306 flows along a direction 308 and flows into the cell 300 through the input flow line 322 and out of the cell 300 through the output flow line 324 as outflow water 312. The water flows through electrodes 302 and 304 and the separator 314. The electrodes 302 and 304 and the separator 314 are sandwiched by the header plates 350 and 352. The electrode 302 contacts and electrically connects the current collector 338. The electrode 304 contacts and electrically connects the current collector 340. The electric circuit 310 applies an electrical potential difference between the electrodes 302 and 304 through the current collectors 338 and 340. The water-permeable separator 314 is disposed between the electrodes 302 and 304.

During a charging stage, as the water 326 flows through the electrodes 302 and 304, ions from the water 326 are attracted to the electrodes 302 and 304 and adsorb to the surfaces of the porous electrodes 302 and 304. During a discharging stage, to avoid ion saturation on the electrodes 302 and 304, the electrodes 302 and 304 are short-circuited or applied with a reverse electrical potential difference (e.g., by the electric circuit 310). As a result, ions previously adsorbed on the electrode surfaces are flushed into waste water flowing through the electrodes 302 and 304.

Header plates 350 and 352 are disposed on the top side and the bottom side of the cell 300 to hold the components together and to provide mechanical strength of the cell 300. A gasket 354 (or multiple gaskets) is disposed between the header plates 350 and 352 and the electrodes 302 and 304. The header plates 350 and 352 and the gasket 354 define a space that accommodates the electrodes 302 and 304 and the separator 314. Because the space is sealed by the gasket 354, water can only flow into and out of the cell 300 through the flow lines 322 and 324. However, the gasket 354 may cause issues in the cell 300 such as electrode drying, cracking, and leaking. For example, leaking may occur around the header plates of the cell 300 and the gasket 354. The leaking can lead to a delay of many days of testing and repairing before the cell can be used again. The gasket 354 between the header plates can cause relatively high dead volume during the production of the cells.

Flow-Through Electrode Capacitive Deionization (FTE-CDI) Cell with Recessed Flow Channels and Epoxy Sealing According to at least some embodiments of the present disclosure, a technology for a flow through cell for capacitive deionization (such as capacitive desalination) or other flow-electrolyte electrochemical processes is disclosed. The disclosed flow through cell combines electrodes, separator, current collectors, and header plates into an assembly that is sealed using epoxy. The arrange enables use of arbitrary electrode dimensions, stacking of one or more electrode pairs within the sealed cell. The disclosed technology of flow through cell overcomes the issues of electrode drying, cracking and leaking. In addition, header plates with recessed flow channels ensure that electrolytes (such as saline water) wets and flows through electrodes evenly.

In some embodiments, the disclosed cell or device may be used for flow-through electrode capacitive deionization. For example, the disclosed cell or device may be used to desalinate brackish water for use in agriculture or municipal water systems. The disclosed cell or device may also be used to generate ultra-pure water for industrial applications, or for selective ion removal (e.g., nitrates or heavy metals). In addition to the flow-through electrode capacitive deionization may also be used in other electrochemical applications (e.g., catalysis) with flowing electrolyte or reagent solutions.

Figure 4:
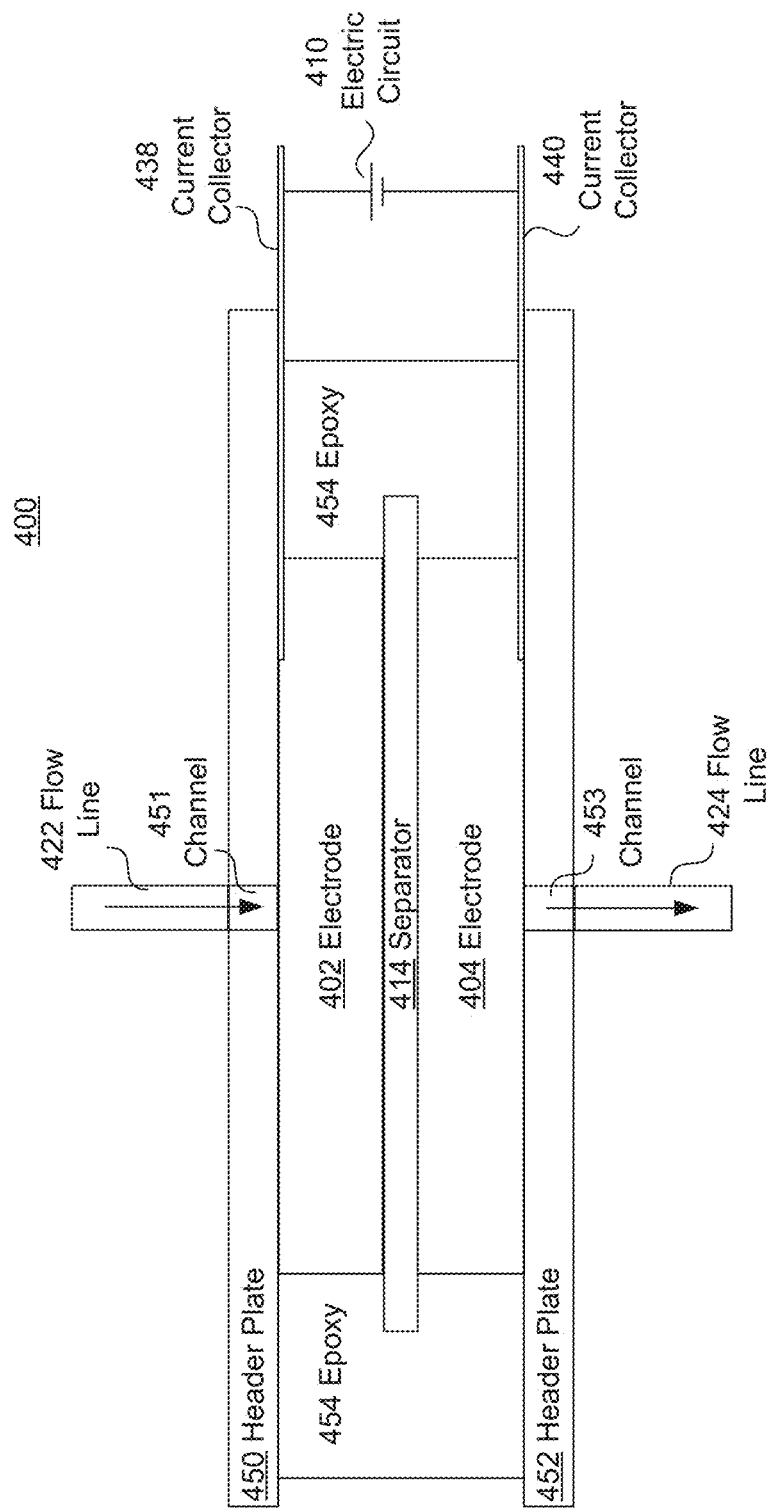
FIG. 4 illustrates an FTE-CDI system sealed by an epoxy.

FIG. 4 illustrates a flow-through electrode capacitive deionization (FTE-CDI) system 400 according to various embodiments of the present disclosure. The FTE-CDI system 400 includes a pair of electrodes 402 and 404, and an electric circuit 410 that energizes the electrodes 402 and 404. The electrode 402 contacts and electrically connects the current collector 438, which electrically connects the electric circuit 410. Similarly, the electrode 404 contacts and electrically connects the current collector 440, which electrically connects the electric circuit 410. The current collectors 438 and 440 are made of, e.g., titanium (or other metals or metal alloys). The current collectors may be foils or wires, and they may be connected to the electrodes using conductive epoxy (e.g. silver epoxy) or paint (e.g. nickel paint), which is completely sealed or potted in epoxy to prevent corrosion. The electric circuit 410 produces an electrical field between the electrodes 402 and 404.

The electrodes 402 and 404 are arranged such that a flow of the feed water flows through the electrodes 402 and 404 and in a direction parallel to an electric field applied across the electrodes 402 and 404.

A water-permeable separator 414 made of an insulative material (e.g., dielectric material) may be disposed between the electrodes 402 and 404 to prevent electrical short-circuits between the electrodes 402 and 404. The separator 414 may be made of, e.g., electrolyte permeable paper or polymer membrane. The thickness of the separator may be, e.g., less than 20% of an overall thickness of each of the electrodes 402 and 404.

Header plates 450 and 452 are disposed to sandwich the electrodes 402 and 404 and the separator 414. The header plates 450 and 452 are made of, e.g., ultraviolet (UV) transparent acrylic material. Alternative to acrylic, other transparent plastic materials may also be used (e.g., polycarbonate). The header plates 450 provides structural support to the electrodes 402 and 404 and the separator 414.

An epoxy 454 is disposed between the header plates 450 and 452 and surrounding the electrodes 402 and 404 and the separator 414. The epoxy 454 may be, e.g., UV-curable epoxy. The header plates 450 and 452 and the epoxy 454 define a space that accommodates the electrodes 402 and 404 and the separator 414. In some embodiments, a combination of the header plates 450 and 452, the electrodes 402 and 404, the separator 414, the current collectors 438 and 440, and the epoxy 454 is referred to as a cell (e.g., an FTE-CDI cell, or a flow through cell).

The FTE-CDI system 400 includes an input flow line 422 and an output flow line 424. In some embodiments, the input flow line 422 and the output flow line 424 are part of the cell. In some embodiments, the cell may include multiple input flow lines and/or multiple output flow lines.

The header plate 450 defines one or more channels therein. For example, as shown in FIG. 4, the header plate 450 defines a channel 451. The channel 451 of the header plate 450 is in fluidic communication with the input flow line 422 and the electrode 402. Similarly, the header plate 452 defines one or more channels therein. For example, as shown in FIG. 4, the header plate 452 defines a channel 453. The channel 453 of the header plate 452 is in fluidic communication with the output flow line 424 and the electrode 404.

Because the space accommodating the electrodes 402 and 404 and the separator 404 is sealed by the epoxy 454, water can only flow into and out of the cell through the flow lines 422 and 424. Thus, during operation, water flow into the FTE-CDI system 400 through the input flow line 422, the channel 451 of the header plate 450 (or multiple channels), the electrode 402, the separator 414, the electrode 404, the channel 453 of the header plate 452 (or multiple channels), and the output flow line 424.

During a charging stage, as the water flows through the electrodes 402 and 404, ions from the water are attracted to the electrodes 402 and 404 and adsorb to the surfaces of the porous electrodes 402 and 404. During a discharging stage, to avoid ion saturation on the electrodes 402 and 404, the electrodes 402 and 404 are short-circuited or applied with a reverse electrical potential difference (e.g., by the electric circuit 410). As a result, ions previously adsorbed on the electrode surfaces are flushed into waste water flowing through the electrodes 402 and 404.

In some embodiments, the material of the electrodes 402 and 404 may be acetic acid resorcinol formaldehyde (AARF) aerogel. The AARF aerogel may be cast as thin sheets. The thin sheets of aerogel may have a length of, e.g., 9 inches, a width of, e.g., 5 inches, and a thickness of, e.g., 700 micrometers. The thin films of AARF aerogel may be cast using a mold including glass slides stacked within a Teflon frame. To eliminate small pinholes in the electrodes 402 and 404, the aerogels may be pre-cured by stirring a solution of the AARF material at, e.g., 30 degrees Celsius, for, e.g., 4 hours, before pouring the solution into the mold.

The cured aerogels are washed in water. The skin layers that form at the interfaces of the aerogels are sanded off while the aerogels are still wet. The water is then exchanged for acetone and the aerogels are dried in a sealed container with a regulated nitrogen flow (e.g., 80 milliliter per minute, or one box-atmosphere exchange for every 2.5 hours). In some embodiments, acetone evaporation that is too fast or unregulated may lead to cracking of the aerogels.

Then the dry aerogels are carbonized under nitrogen at, e.g., 950 degrees Celsius, cooled to ambient temperature, and exposed to air. Then, the aerogels are activated using carbon dioxide at, e.g., 950 degrees Celsius for one hour with a pressure cycling (e.g., from 250 to 700 millitorr) to promote uniform activation through the aerogel material. The activated aerogels are cut to final dimensions of the electrodes 402 and 404 using, e.g., a laser cutting system. For example, the electrodes 402 and 404 may have dimensions of, e.g., 2×3 centimeters, 4×6 centimeters, 6×8 centimeters, or 8×12 centimeters.

Each of the electrodes 402 and 404 made of $CO_2$ activated AARF aerogels may have a hierarchical pore size distribution. The electrode has nanometer-scale pores to provide adsorption sites for the ion, as well as micrometer-scale pores through which water (or other fluids) can be pushed through the electrode at a suitable flow rate without requiring a substantial amount of energy or pressure. As a result, instead of relying on diffusion, the ions in water are actively pushed into and out of the capacitor formed by the electrodes 402 and 404, which significantly reduces deionization (e.g., desalination) time. In some embodiments, the FTE-CDI system 400 may perform a desalination cycle in an energy efficient way in under 4 minutes.

The header plates 450 and 452 provide structural support for the stack of the electrodes 402 and 404 and separator 414. Each of the header plates 450 and 452 may include one or more channels (also referred to as tubulations) for water (or other fluid or electrolyte) to flow through the header plates 450, 452, into and out of the stack of the electrodes 402 and 404 and separator 414. The channels may be formed by, e.g., machining, laser etching or laser cutting. In other words, the channel(s) in the header plate 450 provide fluid communication(s) between the input flow line 422 and the electrode 402, and the channel(s) in the header plate 452 provide fluid communication(s) between the output flow line 424 and the electrode 404. In some embodiment, dimensions of the tubulations may have, e.g., a length of 1 inch and a diameter of 1.6 mm. In some embodiments, the tubulations may be small metal pipes with small barbs on the ends that are glued into holes cut in the header plates, which allow connecting to tubing (silicone tubing).

In some embodiments, the header plates 450 and 452 have a thickness of 0.125 inch and are made of acrylic material that is transparent to UV light or near-UV light. The header plates 450 and 452 are cut to the appropriate sizes. For example, in some embodiments, the bottom header plate 452 is about 2 centimeters longer and 2 centimeters wider than the aerogel thin films of the electrodes 402 and 404; and the top header plate 450 is about 1 centimeter longer and 1 centimeter wider than the aerogel thin films of the electrodes 402 and 404.

In some embodiments, laser cutting is used to create holes in in the header plates where tubulations can be inserted (e.g., glued in) 450 and 452. Laser cutting is also used to etch channels for liquid flow on the inner surface of each header plates 450, 452. In some embodiment, the etching pattern may be 1 square millimeter waffle/grid pattern, the depth of the etching pattern may be about 50 micrometers. The length and the width of the overall etching pattern may be slightly smaller than the length and the width of the electrodes 402 and 404.

Figure 4A:
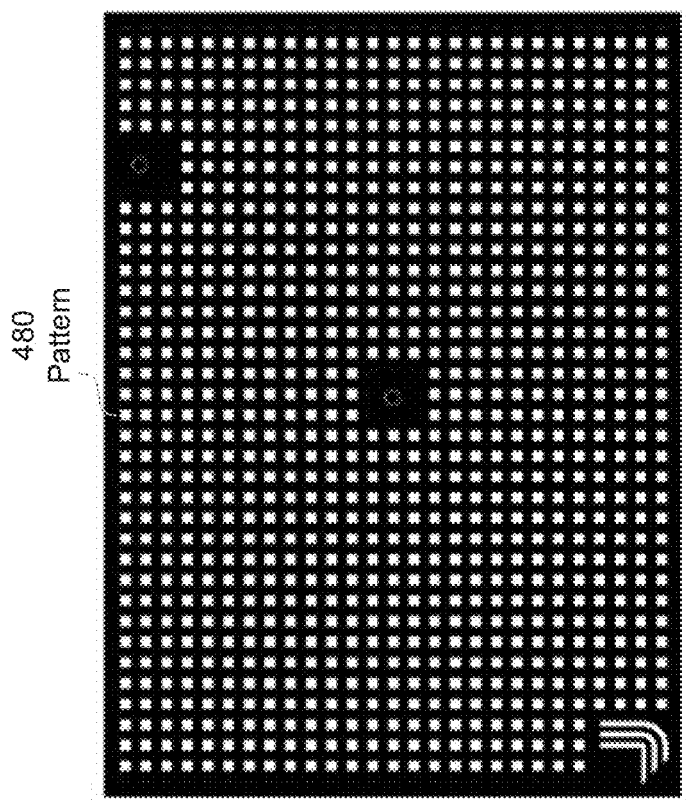
FIG. 4A illustrates an etched side of a header plate of the FTE-CDI system.
Figure 4B:
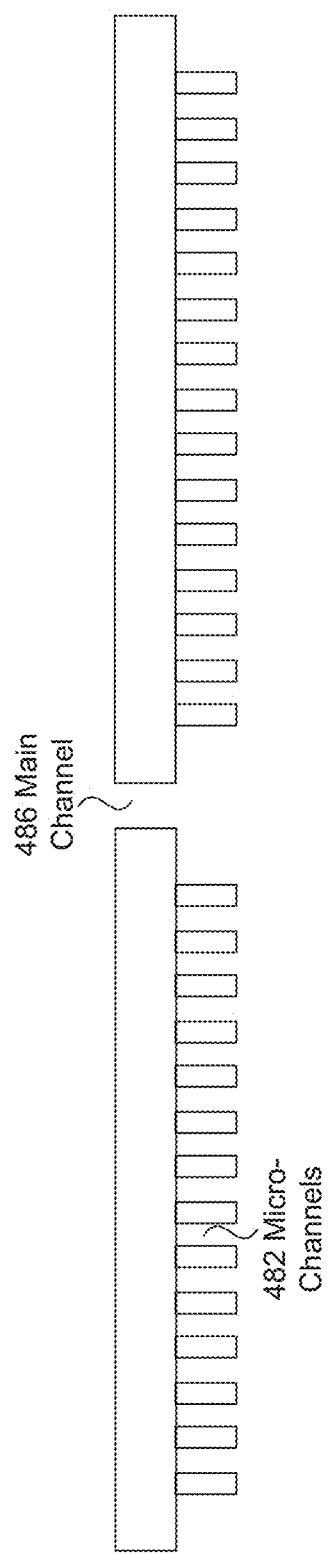
FIG. 4B illustrates a cross-sectional view of the header plate of FIG. 4A.

FIG. 4A illustrates an etched side of a header plate. FIG. 4B illustrates a cross-sectional view of the header plate of FIG. 4A. The header plate may be, e.g., header plate 450 or 452. The etched side of the header plate faces toward the electrodes 402 and 404. For example, as shown in FIG. 4, an etched side of the header plate 450 faces downward and an etched side of the header plate 452 faces upwards. Referring back to FIG. 4A, the header plate may have a dimension of 4×6 centimeters. The black area of the etching pattern 480 are etched down for, e.g., about 50 micrometers. The white area of the etching pattern 480 may be covered by photoresist and is not etched. In other words, micro-channels 482 are formed between the non-etched pillars 484. In some alternative embodiments, the pattern 480 may be created by a laser cutter. The pattern is programmed and the laser cutter rasters across the surface of the header plate 450. The laser cutter turns on the laser to cut away some of the materials when the laser cutter rasters over the black portion of the pattern.

A main channel 486 is formed through the header plate, and is designed to connect external water flow lines (e.g., input flow line 422 or output flow line 424). Thus, water flows through the input flow lines 422 and the main channel 486 are distributed into the micro-channels 482 that cover also almost the entire surface of the electrodes 402 and 404. Similarly, water flows through the electrodes 402 and 404, are then collected by the micro-channels 482, and are accumulated into the main channel 486 of another header plate before reaching the output flow line 424. Therefore, the etching pattern 480 as shown in FIGS. 4A and 4B help the water to flow through the entire electrodes 402 and 404, and all pore surfaces of the electrodes 402 and 404 are utilized for ion adsorption sites.

Figure 4C:
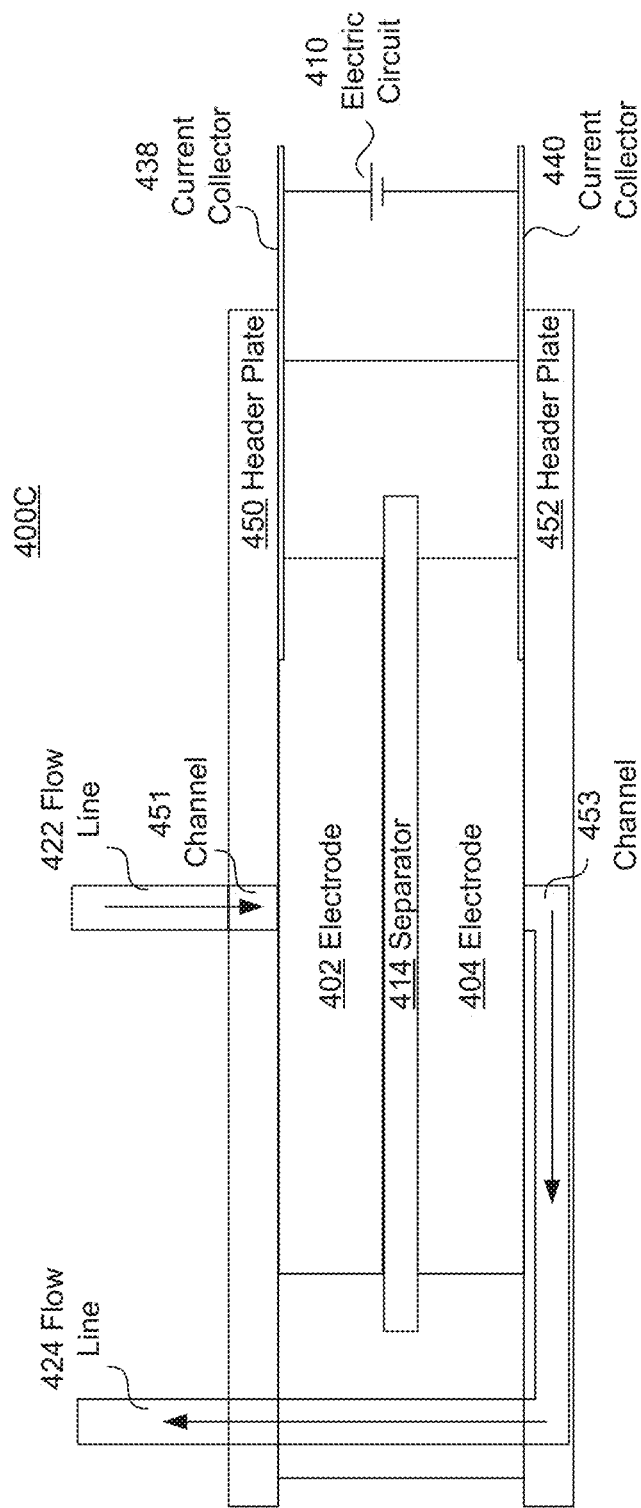
FIG. 4C illustrates an FTE-CDI system including an input flow line and an output flow line disposed on the same side.

FIG. 4C illustrates a flow-through electrode capacitive deionization (FTE-CDI) system 400C according to various embodiments of the present disclosure. The FTE-CDI system 400C is similar to the FTE-CDI system 400 as illustrated in FIG. 4, except that the input flow line 422 and the output flow line 424 of the FTE-CDI system 400C lead to the same side of the system. As shown in FIG. 4C, the output flow line 424 travels through the top header plate 450 and reaches the bottom header plate 452. In some embodiments, the epoxy 454 encapsulates a portion of the output flow line 424 that is between the header plates 450 and 452.

Figure 4D:
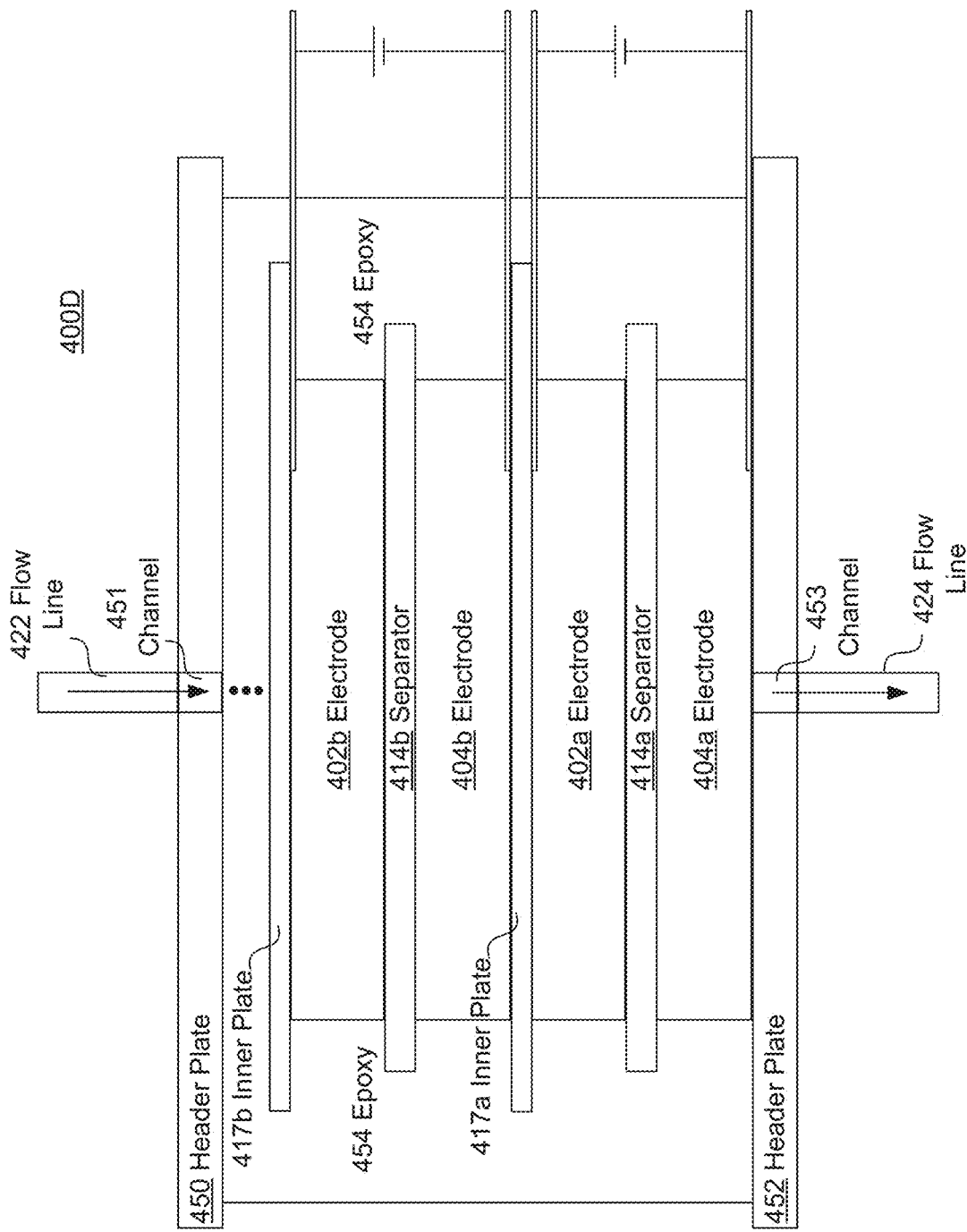
FIG. 4D illustrates an FTE-CDI system including multiple electrode stacks separated by inner plates.

FIG. 4D illustrates a flow-through electrode capacitive deionization (FTE-CDI) system 400D according to various embodiments of the present disclosure. The FTE-CDI system 400D is similar to the FTE-CDI system 400 as illustrated in FIG. 4, except that the FTE-CDI system 400D includes multiple electrode stacks. Each electrode stack includes a pair of electrodes and a separator between the electrode pair. For example, an electrode stack 415a includes electrodes 402a and 404a and a separator 414a; an electrode stack 415b includes electrodes 402b and 404b and a separator 414b, etc. The FTE-CDI system 400D further includes inner plates 417a, 417b, etc. to separate the electrode stacks 415a, 415b, etc. from each other. The inner plates 417a, 417b, etc. may be made of a material that is the same as the material of the header plates 450 and 452. In some alternative embodiments, other than using inner plates or header plates, the electrode stacks may be separated by other suitable separator materials. Similar to the header plates 450 and 452, each of the inner plates 417a, 417b, etc. may include one or more channels for the water to flow through.

Figure 4E:
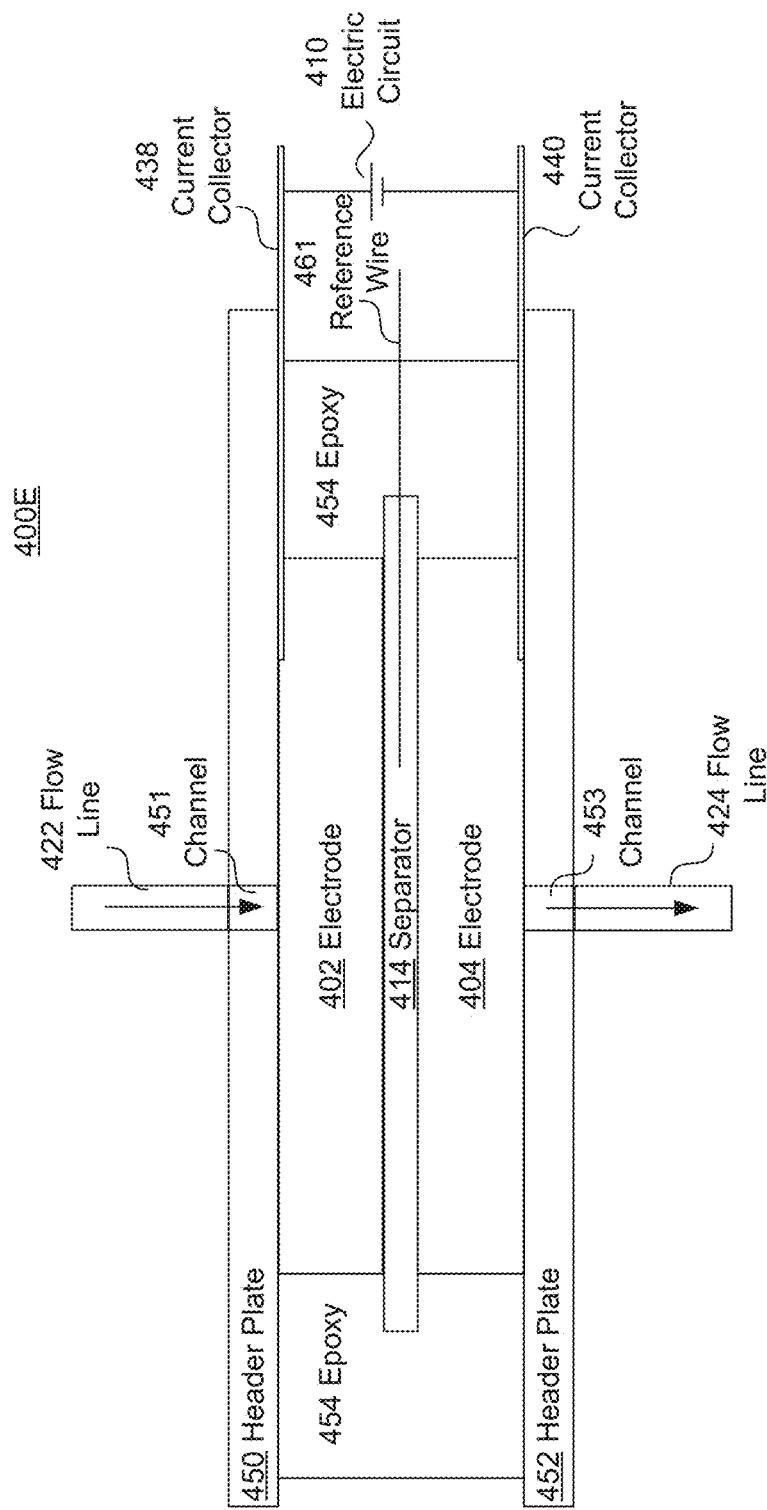
FIG. 4E illustrates an FTE-CDI system including a reference wire.

FIG. 4E illustrates a flow-through electrode capacitive deionization (FTE-CDI) system 400E according to various embodiments of the present disclosure. The FTE-CDI system 400E is similar to the FTE-CDI system 400 as illustrated in FIG. 4, except that the system 400E further includes a reference wire 461 inserted between the electrodes 402 and 404. In some embodiments, the reference wire 461 is inserted in the water-permeable separator 414. The reference wire 461 may be, e.g., a silver wire or a silver chloride wire treated with a bleach for about 30 minutes. The reference wire 461 may be used to monitor the potential on the individual electrodes 402 and 404 with respect to the reference potential, which indicates a status of the ion adsorption to the electrodes 402 and 404. For example, the voltage may not be evenly distributed between the two electrodes, indicating asymmetric capacitance and potential electrode degradation.

Figure 5B:
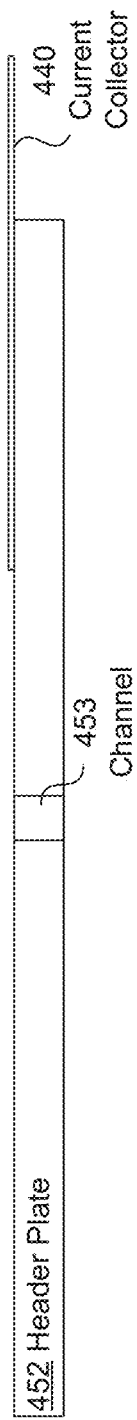
FIG. 5B illustrates one or more stages of a method of fabricating an FTE-CDI cell.

FIGS. 5A-5L illustrate various stages of a method of fabricating a flow-through electrode capacitive deionization (FTE-CDI) cell according to various embodiments of the present disclosure. As shown in FIG. 5A, a bottom header plate 452 is provided with an etched side facing upward.

As shown in FIG. 5B, a current collector 440 is placed on the bottom header plate 452. At least a portion of the current collector 440 contacts the bottom header plate 452. In some embodiments, the current collector 440 is placed at a position such that a portion of the current collector 440 will contact an edge of an electrode 404 to be placed on top of the current collector 440 and the bottom header plate 452. In some embodiments, the current collector 440 may include one or more titanium foil strips. The titanium foil strip may have a thickness of, e.g., 0.03 inch, a width of, e.g., 1 centimeter, and a length of, e.g., 6 centimeters. In some embodiments, other current collector materials such as copper and aluminum may corrode under the operating condition of the cell. For example, performance of a cell with a copper foil with silver epoxy may degrade over time, with an increased resistance, a reduced capacity, and a lower efficiency. In some alternative embodiments, the current collector 440 may be a conductive wire (e.g., Ti, Ni, or Cu) attached to a side of the electrode with epoxy and/or conductive paint. The conductive wire may be covered with epoxy to prevent water instruction and corrosion. In some embodiments, the conductive wire may be attached to the electrode, before the electrode is wetted and assembled into a cell.

Figure 5C:
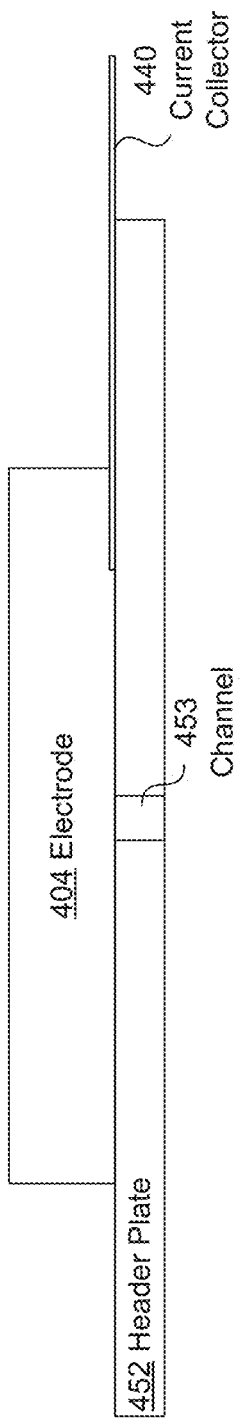
FIG. 5C illustrates one or more stages of a method of fabricating an FTE-CDI cell.

As shown in FIG. 5C, a fully wetted electrode 404 is placed on top of the current collector 440 and the bottom header plate 452. The electrode 404 contacts and electrically connects the current collector 440.

Figure 5D:
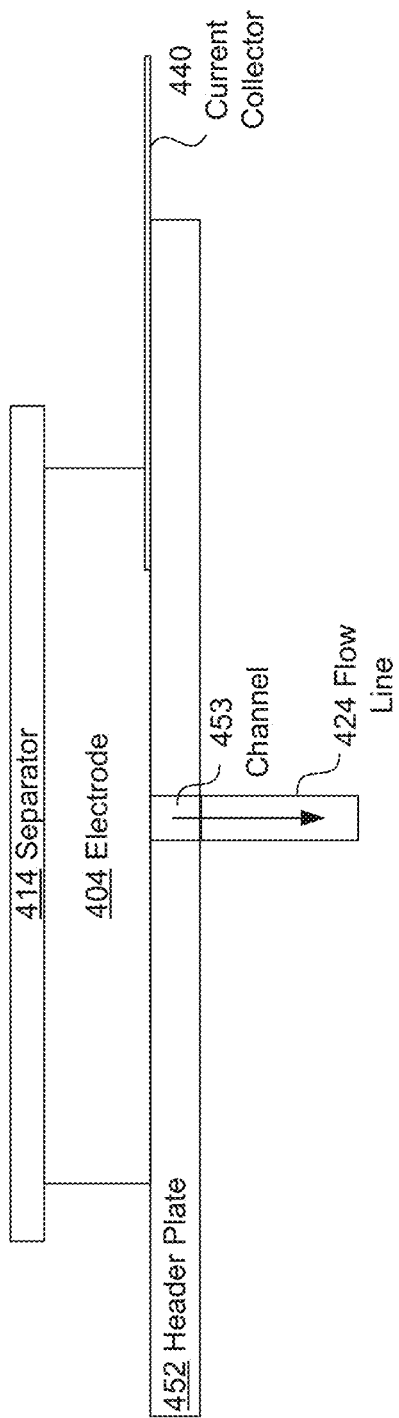
FIG. 5D illustrates one or more stages of a method of fabricating an FTE-CDI cell.

As shown in FIG. 5D, a fully wetted separator 414 is placed on top of the electrode 404. In some embodiments, the separator 414 is larger than the electrode 404 and completely covers a top surface of the electrode 404. For example, the length and the width of the separator 414 may be, e.g., 1 millimeter higher than the length and the width of the electrode 404. The water-permeable separator 414 may be a porous paper (e.g., coffer filter paper), a polymer film, or a membrane.

Figure 5E:
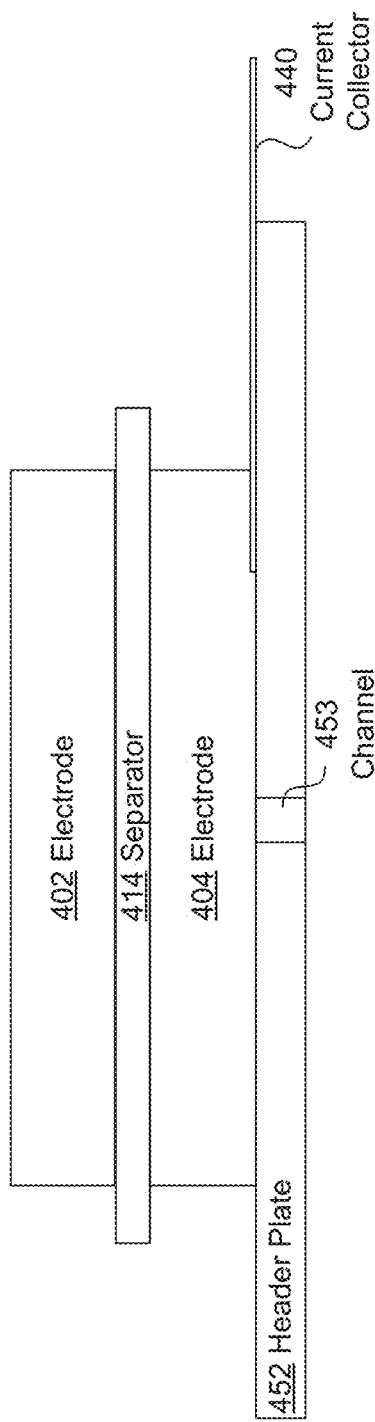
FIG. 5E illustrates one or more stages of a method of fabricating an FTE-CDI cell.

As shown in FIG. 5E, a fully wetted electrode 402 is placed on top of the separator 414. To prevent short circuit, the separator 414 ensures that the electrodes 402 and 404 are not in direct contact with each other.

Figure 5F:
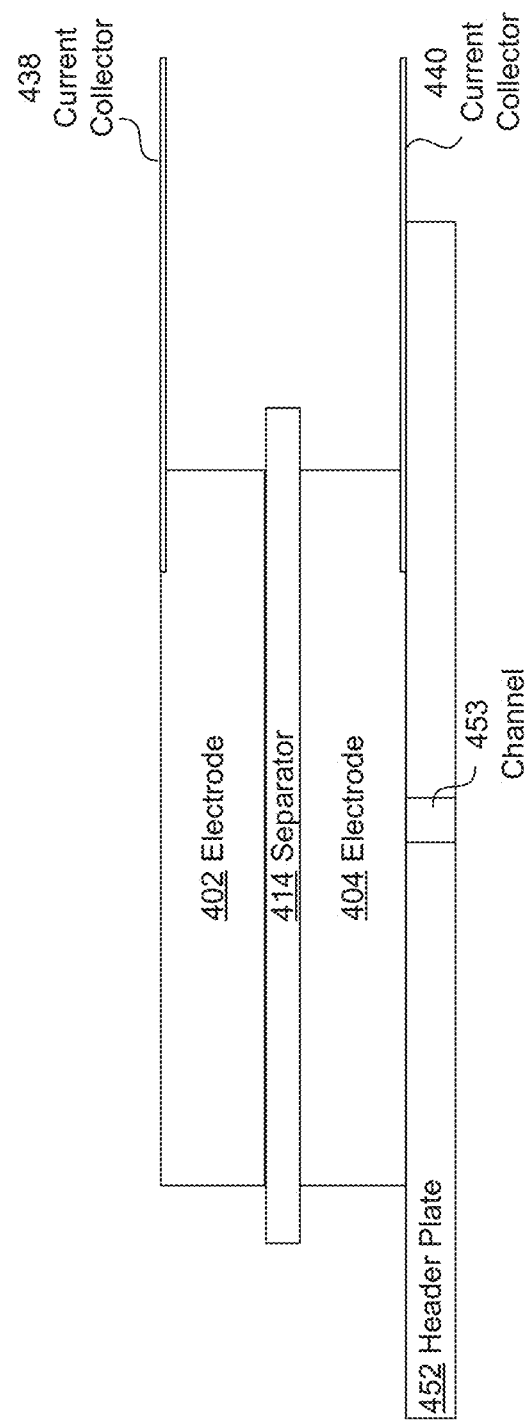
FIG. 5F illustrates one or more stages of a method of fabricating an FTE-CDI cell.

As shown in FIG. 5F, a current collector 438 is placed on the electrode 402. In some embodiments, the current collector 438 is placed at a position such that a portion of the current collector 438 contacts an edge of an electrode 402. In some embodiments, the current collector 438 may include one or more titanium foil strips. The titanium foil strip may have a thickness of, e.g., 0.03 inch, a width of, e.g., 1 centimeter, and a length of, e.g., 6 centimeters. The electrodes 402 and 404, the separator 414, and the current collectors 438 and 440 form an electrode stack 415a.

Figure 5G:
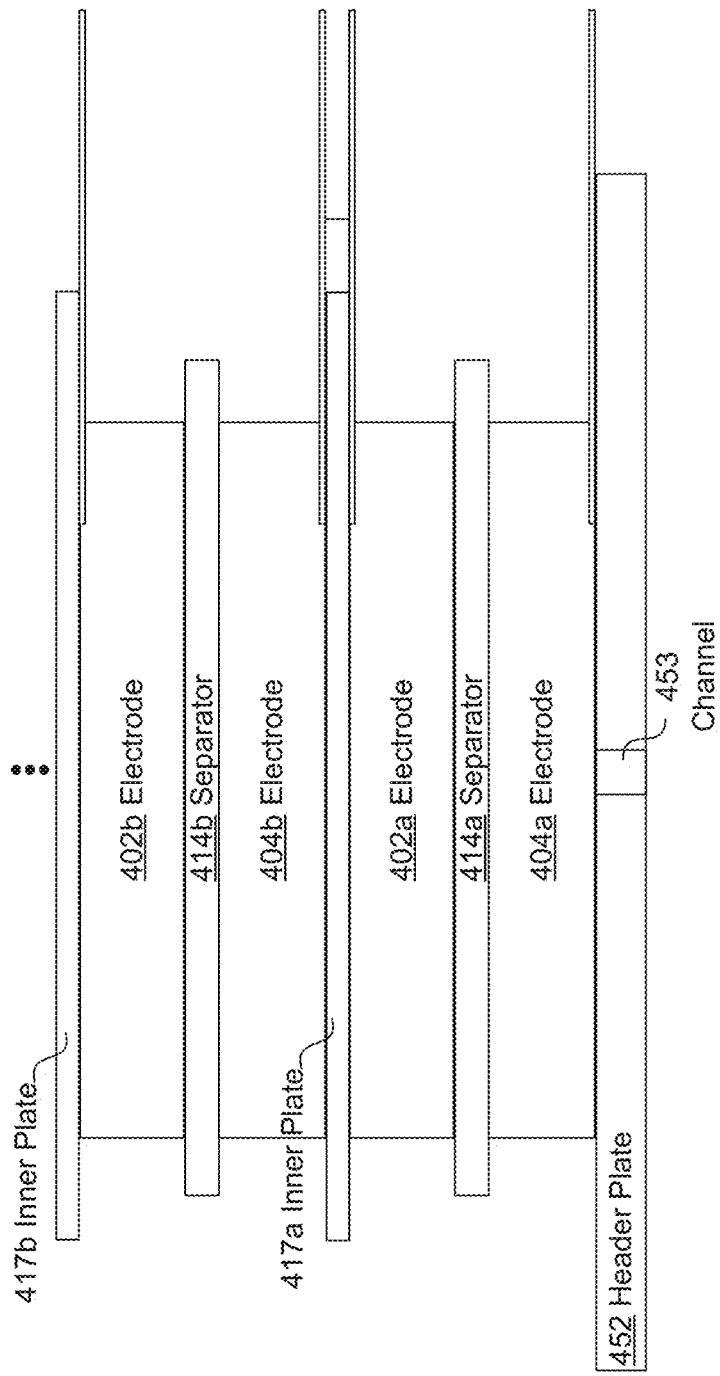
FIG. 5G illustrates one or more stages of a method of fabricating an FTE-CDI cell.

As shown in FIG. 5G, the steps illustrated in FIGS. 5B-5F may be repeated to dispose additional electrode stacks 415b, etc. on top of each other. Similar to the electrode stack 415a, each additional electrode stack may include electrodes, a separator, and current collectors. There may be inner plates 417a, 417b, etc. to separate the electrode stacks 415a, 415b, etc. from each other. The inner plates 417a, 417b, etc. may be made of a material that is the same as the material of the header plates 450 and 452. Similar to the header plates 450 and 452, each of the inner plates 417a, 417b, etc. may include one or more channels for the water to flow through.

As shown in FIG. 5H, a top header plate 450 is placed on top of the electrode stack 415a, 415b, etc. The top header plate 450 is placed with an etched side facing downward.

Figure 5I:
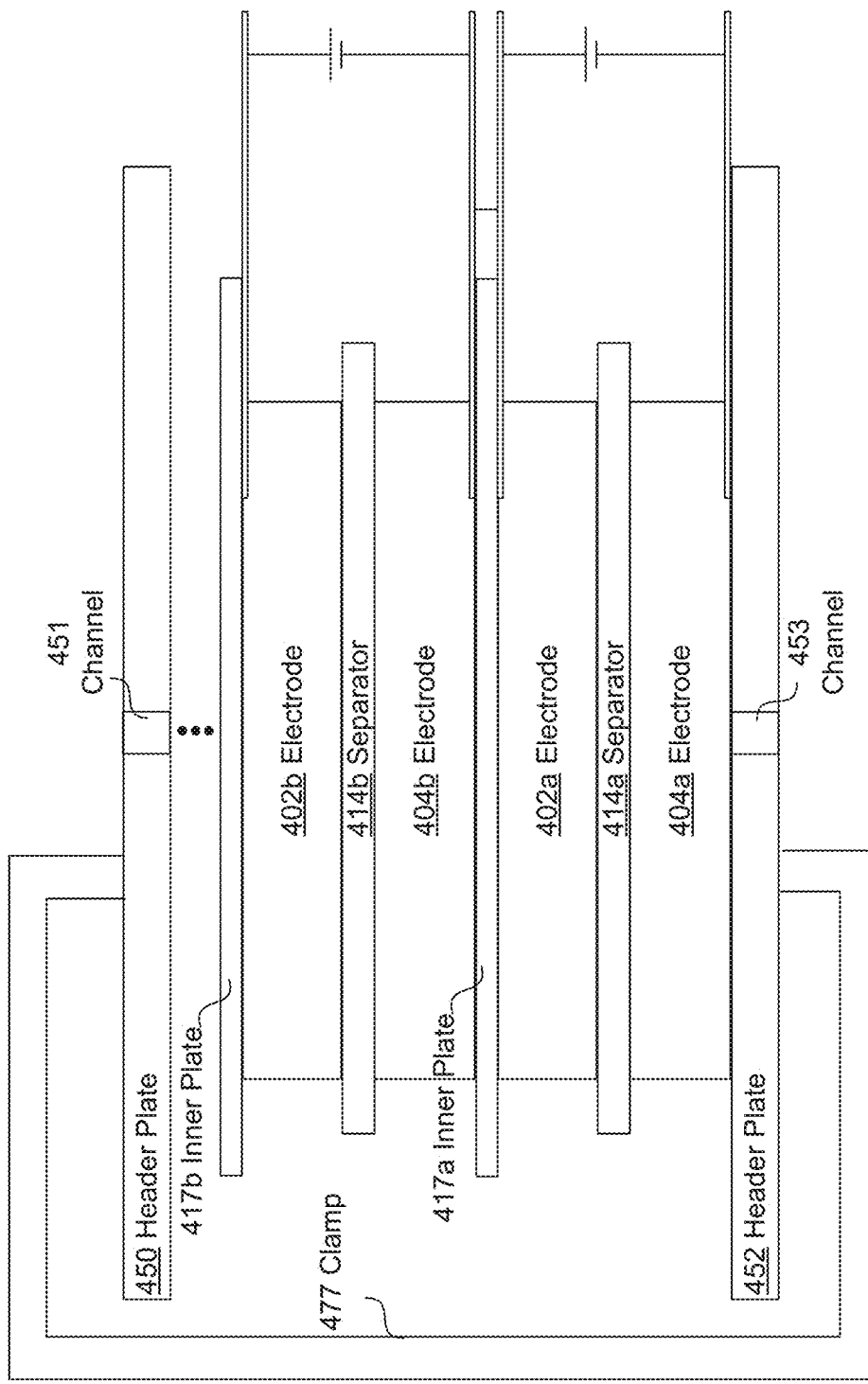
FIG. 5I illustrates one or more stages of a method of fabricating an FTE-CDI cell.

As shown in FIG. 5I, the entire assembly may be clamped together using, e.g., a C-clamp 477.

Figure 5J:
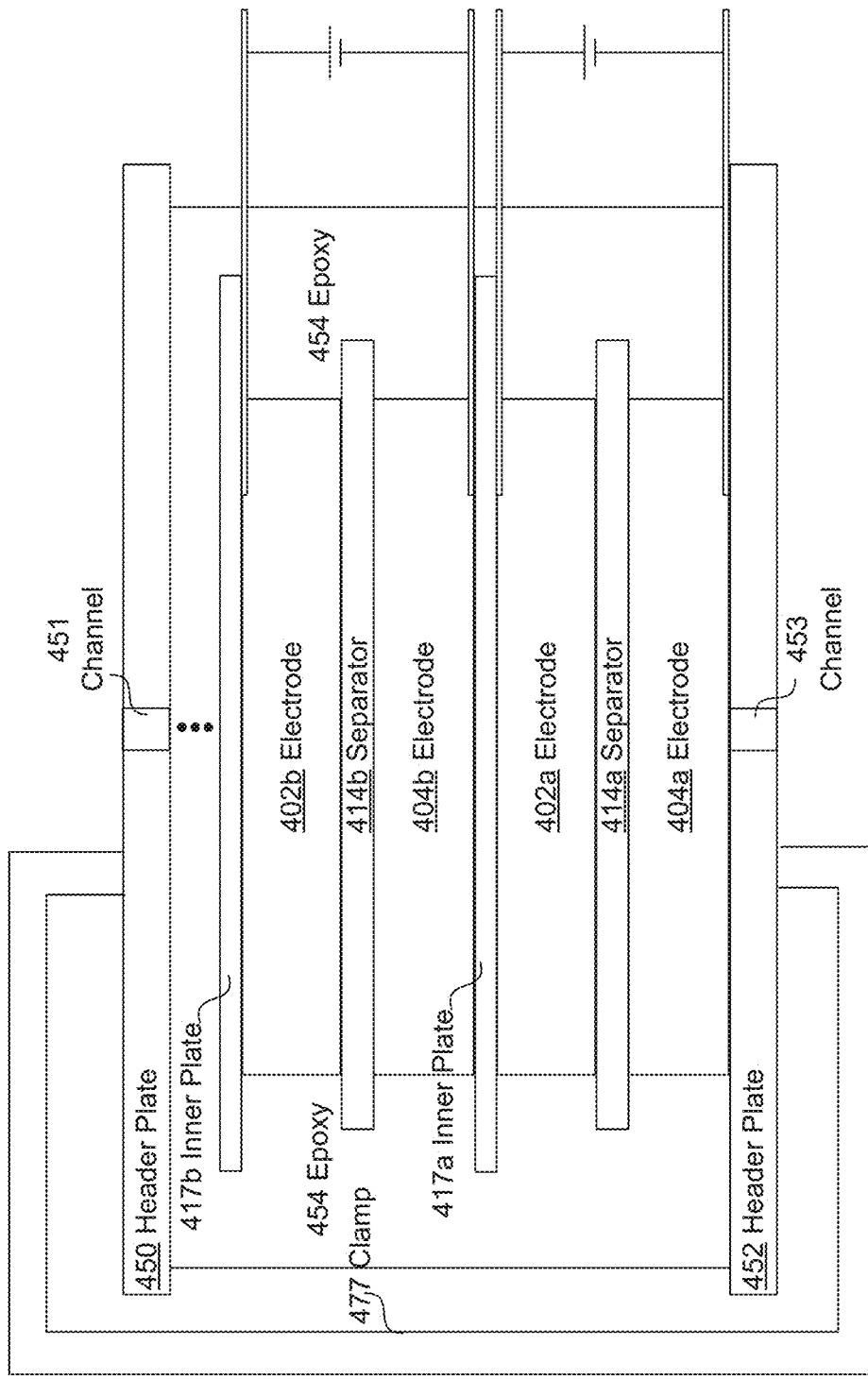
FIG. 5J illustrates one or more stages of a method of fabricating an FTE-CDI cell.

As shown in FIG. 5J, a UV-curable epoxy 454 is disposed between the header plates 450 and 452 to seal a space that accommodates the electrode stacks 415a, 415b, etc. In some embodiments, the UV-curable epoxy 454 may include, e.g., Loctite Stycast 1266 Part A, with a 3 wt % butyglycidyl ether as a reactive dilutant, and 1 wt % a UV photo-acid generator (or other types of UV-activated initiator or catalyst). The epoxy 454 may be applied using, e.g., a syringe with a precision applicator tip. Air bubbles may be removed using another syringe with a thin needle. In some other embodiments, the epoxy 454 may be replaced with, e.g., silicone sealant (Room-Temperature-Vulcanization (RTV) silicone), thermally-cured epoxy, UV-cured acrylate or acrylic (e.g., poly(ethyleneglycol) diacrylate (PEGDA)) with UV radical initiator (e.g., Irgacure 907).

Figure 5K:
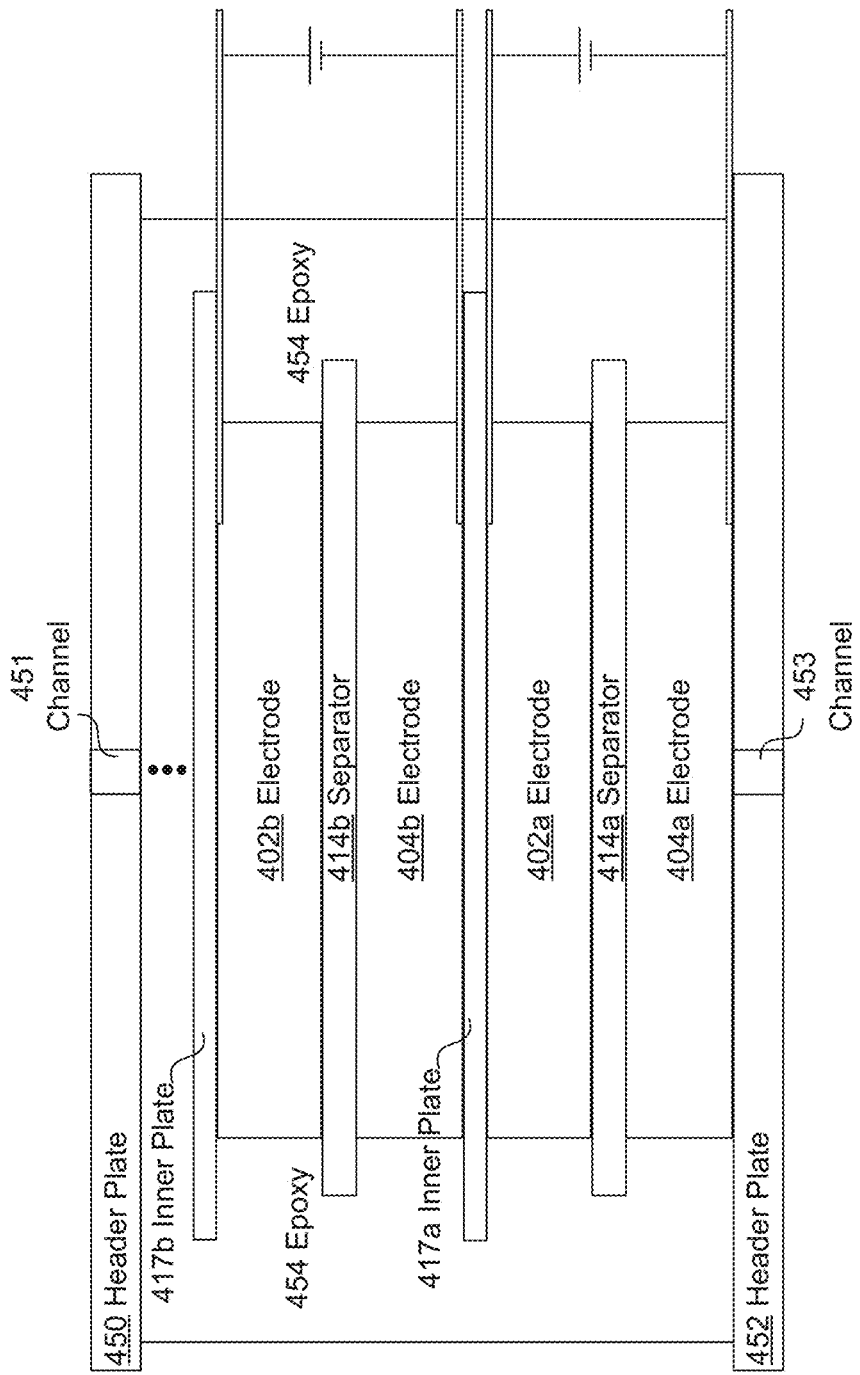
FIG. 5K illustrates one or more stages of a method of fabricating an FTE-CDI cell.

As shown in FIG. 5K, the epoxy 454 is cured using a UV or near-UV light for, e.g., about 1 minute. Then the clamp is removed and the cell is flipped over and the epoxy 454 is further cured using a UV or near-UV light for, e.g., about 1 minute.

Figure 5L:
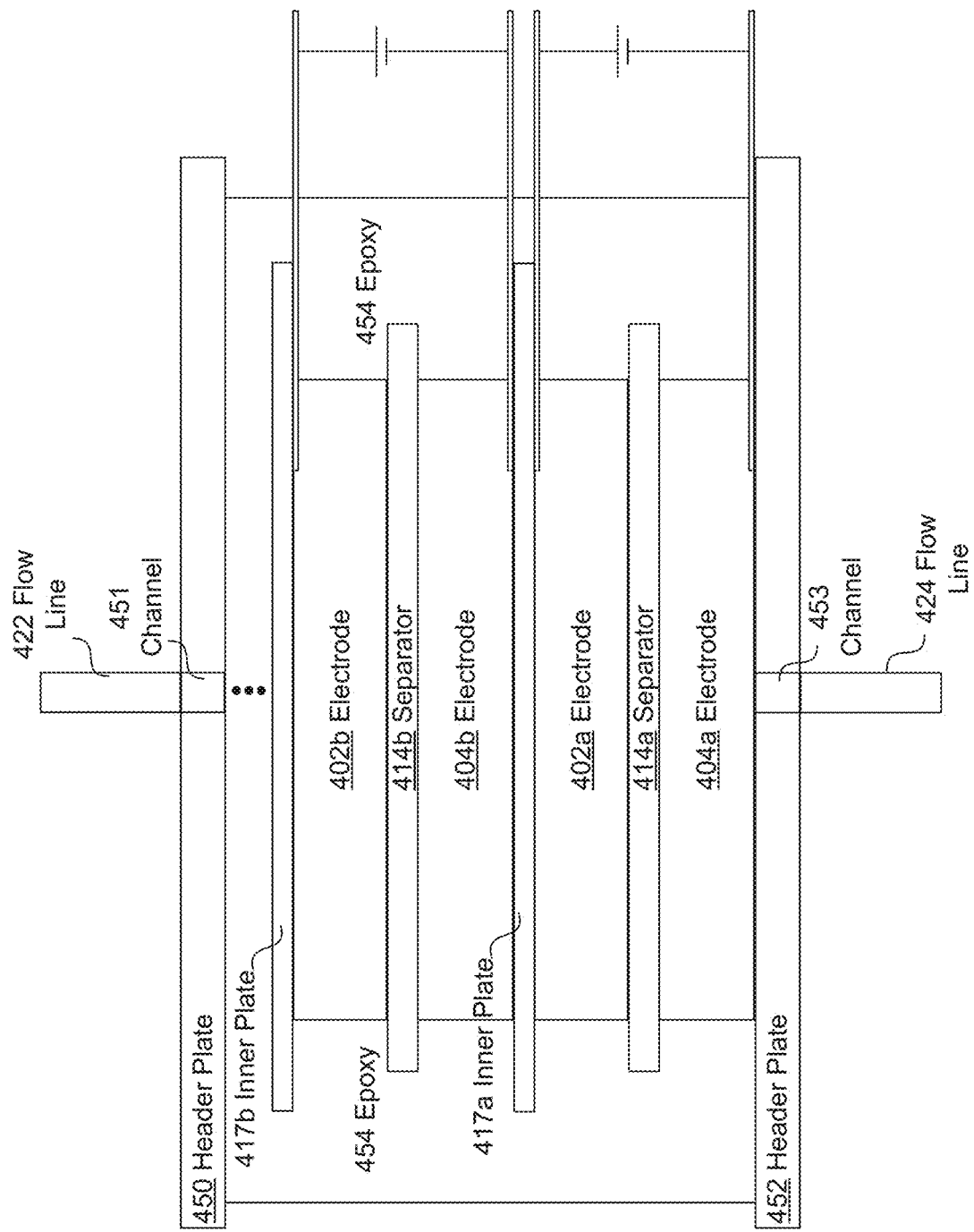
FIG. 5L illustrates one or more stages of a method of fabricating an FTE-CDI cell.
Figure 6:
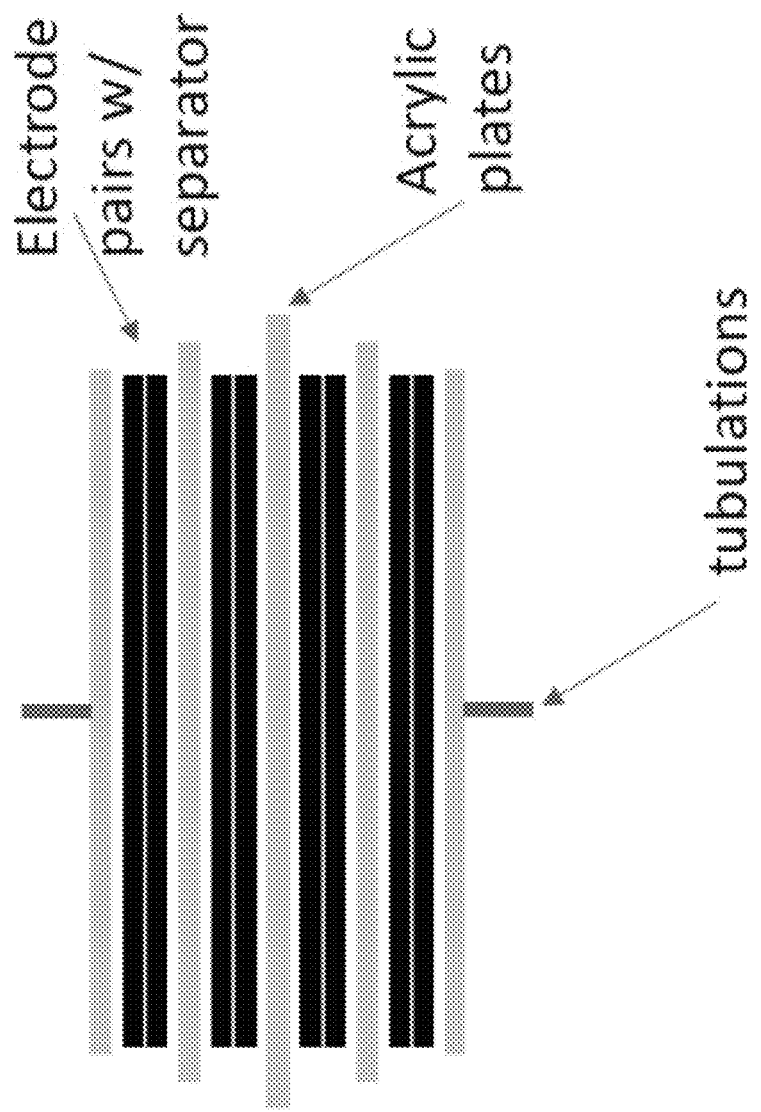
FIG. 6 illustrates one embodiment of designs for isolated electrode pairs within a single package, including plates with waffle patterns on both sides and single holes or many holes in the center (see FIG. 4A), located between individual pairs of electrodes but all potted/packaged/sealed together with epoxy.
Figure 7:
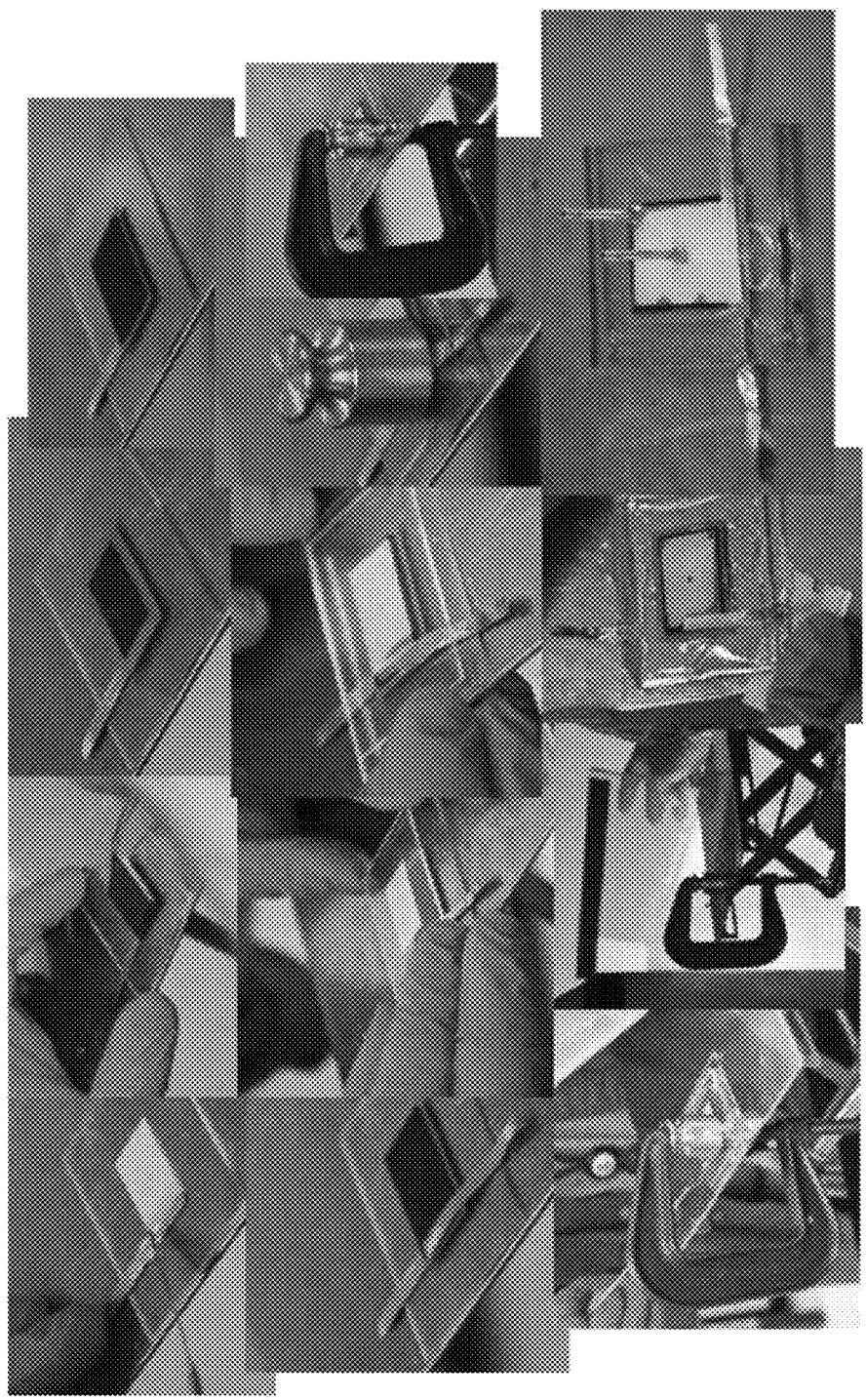
FIG. 7 illustrates one embodiment of fabricating an FTE-CDI cell.
Figure 8:
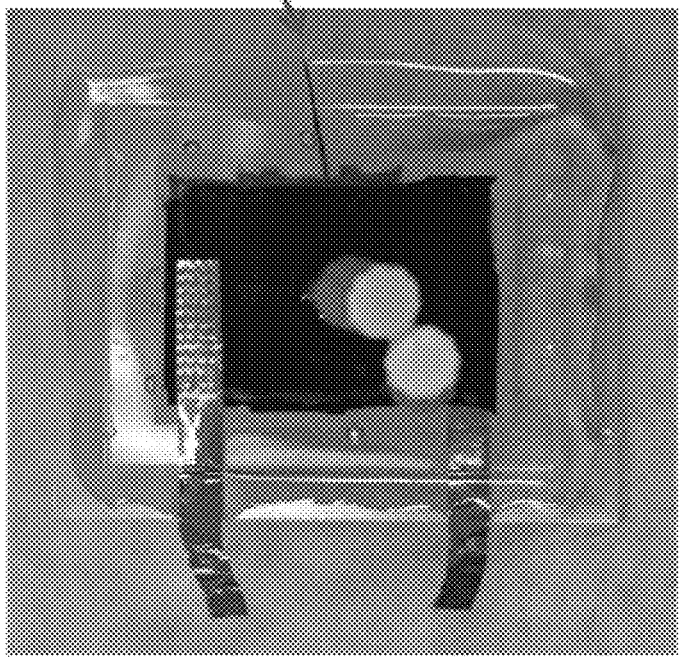
FIG. 8 illustrates one embodiment with Ag/AgCl reference electrode in situ.
Figure 8:
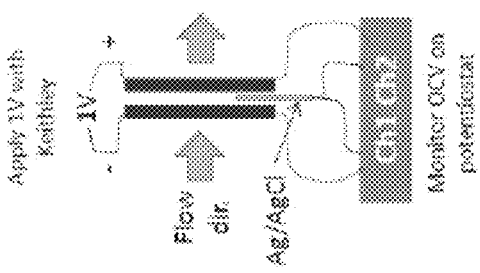

As shown in FIG. 5L, the input flow line 422 and the output flow line 424 are attached to the header plates 450 and 452. In some embodiments, the input flow line 422 and the output flow line 424 may be attached to the header plates 450 and 452 using the same epoxy as the UV-curable epoxy 454. Therefore, as shown in FIG. 5L, a flow-through electrode capacitive deionization (FTE-CDI) cell is formed.

In some embodiments, the cell formed as in FIG. 5L may be tested for leaks by infilling with salt solution. An electrochemical impedance spectroscopy may be used to measure the resistance of the cell and check for existence of any short circuits. A cyclic voltammetry may be used to measure cell capacitance.

WORKING EXAMPLE

Example 1

This example describes a design for a flow through cell for capacitive desalination or other flow-electrolyte electrochemical processes. The cell design combines electrodes, separators, current collectors, and header plates into one assembly, completely sealed with epoxy. This design enables the use of arbitrary electrode dimensions, stacking of multiple electrode pairs within one sealed assembly, and helps overcome electrode drying, cracking, and leaking issues that were common in previous cell designs. Header plates with recessed flow channels ensure that electrolyte wets and flows through electrodes evenly.

This example is an improvement over previous flow-through electrode capacitive deionization technology (FTE-CDI), including phased charging. FTE-CDI can be used to desalinate brackish water for use in agriculture or municipal water systems. It can also be used to generate ultrapure water for industrial applications, or for selective ion removal (e.g., nitrates or heavy metals). In addition to supporting FTE-CDI, this embodiment could be used in other electrochemical applications (e.g., catalysis) with flowing electrolyte or reagent solutions.

The current state-of-the-art for water desalination is reverse osmosis (RO). Reverse osmosis uses membranes that allow water, but not salt, to pass through membranes. Pressure is applied to the feed side, pushing water across the membrane to overcome membrane resistance, as well as the osmotic pressure. Energy use in RO scales with the amount of water produced; for seawater its energy efficiency is unsurpassed, however at low salt concentration the energy efficiency of RO is significantly reduced.

Capacitive deionization (CDI) is a more recent technology. Unlike membrane-based methods, FTE-CD removes salt with electric fields. The charged salt ions are attracted to the charged electrodes and thus removed from the water. The device is operated by charging the two electrodes, which act like plates of a supercapacitor, while water passes between them to remove the salt from the feed water. The energy cost of CDI is proportional to the amount of salt removed, thus giving it the potential to be far more energy efficient than RO. However, early CDI devices were plagued by their low removal rates, as mass transport in these cells was limited by diffusion. The charge/discharge cycle could take 30 minutes or more, and removing salt from the electrodes was challenging. The standard material employed in flow between CDI consists of a porous carbon with a large surface area provided by nanometer scale pores. These pores increase the amount of salt that can be adsorbed, but it is not energy efficient to flow water through them because the pressure required rivals what is needed for RO membranes.

Flow-through electrode capacitive deionization (FTE-CDI) employs a new material in a different geometry to increase the process rate by almost an order of magnitude, compared with flow between CDI. FTE-CDI uses a carbon material that has a hierarchical pore size distribution (e.g., $CO_2$ activated resorcinol formaldehyde aerogel). It still has nanometer scale pores to provide adsorption sites, but it also has micron-sized pores through which water can be pushed at relevant flow rates without requiring a substantial amount of energy. This material can now be used in a different geometry—rather than passing water between the electrodes, the water is pushed through the electrodes. Instead of relying on diffusion, the salt is actively pushed into and out of the capacitor, which reduces desalination time substantially. Instead of taking 30-60 minutes, a desalination cycle can be performed energy efficiently in under 4 minutes.

The cell of this embodiments is composed of one or multiple pairs of porous electrodes (e.g., carbon aerogel), with metal (e.g., titanium, silver, copper) current collectors, separated by non-conductive, electrolyte permeable paper or polymer membranes. The electrodes were sandwiched between header plates made of UV transparent acrylic material, which provide structural support to the electrodes and which have machined (or laser etched) channels for electrolyte/salt water flow facing the electrodes.

The electrode material is acetic acid catalyzed resorcinol formaldehyde (AARF) aerogel. For the FTE-CDI application, aerogels were cast as thin sheets of overall dimensions of 9×5 inches by ca. 700 um thickness using a mold consisting of glass slides stacked within a Teflon frame. The aerogel (allow solution to stir 4 hr at 30° C.) was pre-cured before being poured into the mold to eliminate small pinholes in the electrodes. The cured gels were washed in water. The skin layer that forms at the interface of the gel and slide was sanded off while the gels were still wet. Then water was exchanged for acetone and the gels were dried in a sealed container with regulated $N_2$ flow (80 mL/min, or one box-atmosphere exchange every 2.5 hr). Faster or unregulated acetone evaporation led to cracking of the gels. The dry gels were carbonized under $N_2$ at 950° C., cooled to ambient and exposed to air, then activated with $CO_2$ at 950° C. for 1 hour with pressure cycling (~250-700 mTorr) to promote uniform activation through the bulk of the material. The activated electrodes were cut to their final dimensions using a laser cutting system (Universal Laser Systems VLS4.60). Typical final dimensions were 2×3 cm, 4×6 cm, 6×8 cm, and 8×12 cm.

The header plates provide structural support for the electrode stack and have tubulations to connect electrolyte/water inlet and outlet hoses. They were made of ⅛ inch thick clear acrylic which is transparent to near-UV (e.g., ePlastics (Ridout Plastics) clear plexiglass acrylic sheet ACRYCLR0.040PM12X36). The plates were cut to the appropriate size (typically 2 cm larger than the electrodes in x,y dimensions for lower plate and 1 cm larger than the electrodes for the upper plate) and holes for the tubulations were cut using the laser cutting system. The laser system was also used to etch channels for liquid flow on the inner face of each header plate. The optimum etch design is a ca. 1 mm2 waffle/grid pattern, with channels ca. 50 μm deep, and overall x,y dimensions slightly smaller than the electrodes.

The electrode stack is composed of one or more electrode pairs separated by porous paper or polymer films cut slightly larger (ca. 1 mm) than the electrodes. Standard basket-type coffee filter paper were used as the separator material. Current collectors were titanium foil strips 0.030 in thick by 1 cm wide by 6 cm long, while other current collector materials such as copper and aluminum can corrode under the operating conditions. An example stack was built as follows:

1. Lay bottom header on work surface with etched side up;
2. Place Ti current collector strip into position on header plate (so that it would be on the edge of the electrode);
3. Place fully wetted electrode into position, completely covering current collector;
4. Place fully wetted separator material over electrode, ensuring complete coverage of the electrode;
5. Place second electrode on separator material, again insuring that separator completely covers electrode to prevent short circuits;
6. Position Ti current collector on second electrode edge;
7. Repeat steps 4-6 to build multi pair stacks;
8. Lay top header etched side down on top of electrode stack;
9. Clamp the entire assembly together using C-clamps before potting with epoxy Potting with UV-Curable Epoxy.

The UV-curable epoxy is composed of Loctite Stycast 1266 CL PTA (Part A), with 3 wt % butylglycidyl ether as a reactive dilutant, and 1 wt % triarylsulfonium hexafluoroantimonate as the UV-photo acid initiator. The epoxy was applied between the top and bottom header plates using a syringe with a precision applicator tip. Any air bubbles were removed using a second syringe with a thin needle. The epoxy was cured using a UV light for ca. 1 min, then the clamps were removed and the cell was flipped over for a second UV cure of ca. 1 min. Tubulations were attached to the top and bottom of the cell using the same UV epoxy.

The assembled cells were tested for leaks by infilling with NaCl solution (0.02-1 M). Electrochemical impedance spectroscopy was used to measure the resistance of the cell and check for short circuits. Cyclic voltammetry was used to measure cell capacitance.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A capacitive deionization device for removing ions from a target solution, comprising:
a first porous electrode;
a second porous electrode below and spaced from the first porous electrode;
a first frame around the first porous electrode and attached with the first porous electrode by epoxy between the first frame and the first porous electrode;
a second frame around the second porous electrode and attached with the second porous electrode by epoxy between the second frame and the second porous electrode;
a first header plate disposed on the first frame, the first header plate defining an input flow channel that is in fluidic communication with the first porous electrode;
a second header plate disposed below the second frame, the second header plate defining an output flow channel that is in fluidic communication with the second porous electrode;
a sealant disposed between the first header plate and the second header plate, the sealant comprising a first gasket adjacent to the first header plate and a second gasket adjacent to the second header plate, the sealant, the first header plate, and the second header plate defining a space accommodating at least the first porous electrode and the second porous electrode, the sealant surrounding the first porous electrode and the second porous electrode to seal the space;
a first current collector having a first portion and a second portion, the first portion of the first current collector disposed between (i) the first porous electrode and the first frame and (ii) the first gasket, the second portion of the first current collector extending beyond the first frame and the first gasket; and
a second current collector having a first portion and a second portion, the first portion of the second current collector disposed between (i) the second porous electrode and the second frame and (ii) the second gasket, the second portion of the second current collector extending beyond the second frame and the second gasket.

2. The capacitive deionization device of claim 1, further comprising:
a non-conductive separator disposed between the first porous electrode and the second porous electrode, the non-conductive separator being permeable to the target solution, the sealant surrounding the non-conductive separator.

3. The capacitive deionization device of claim 1, further comprising:
an electric circuit electrically connecting the second portion of the first current collector and the second portion of the second current collector, during operation the electric circuit producing an electric field across the first porous electrode and the second porous electrode.

4. The capacitive deionization device of claim 1, wherein the first porous electrode has micrometer-scale pores permeable to the target solution, and the first porous electrode has nanometer-scale pores to which ions of the target solution having a first charge state adsorb in response to an electric field across the first porous electrode and the second porous electrode.

5. The capacitive deionization device of claim 1, wherein the second porous electrode has micrometer-scale pores permeable to the target solution, and the second porous electrode has nanometer-scale pores to which ions of the target solution having a second charge state adsorb in response to an electric field across the first porous electrode and the second porous electrode.

6. The capacitive deionization device of claim 1, wherein the sealant is an ultraviolet (UV)-curable epoxy that includes a UV photo-acid generator.

7. The capacitive deionization device of claim 1, further comprising:
an input flow line attached to the first header plate, the input flow line in fluidic communication with the input flow channel of the first header plate; and
an output flow line attached to the second header plate, the output flow line in fluidic communication with the output flow channel of the second header plate.

* * * * *

UNITED STATES PATENT AND TRADEMARK OFFICE
CERTIFICATE OF CORRECTION

| | | |
|---|---|---|
| PATENT NO. | : 11,407,663 B2 | Page 1 of 1 |
| APPLICATION NO. | : 15/809864 | |
| DATED | : August 9, 2022 | |
| INVENTOR(S) | : Campbell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this
Eleventh Day of February, 2025

Coke Morgan Stewart
*Acting Director of the United States Patent and Trademark Office*